(12) United States Patent
Choi et al.

(10) Patent No.: US 11,182,108 B2
(45) Date of Patent: Nov. 23, 2021

(54) MEMORY SYSTEM, MEMORY CONTROLLER, AND OPERATION METHOD

(71) Applicant: SK hynix Inc., Gyeonggi-do (KR)

(72) Inventors: Young Guen Choi, Gyeonggi-do (KR); Dong Ham Yim, Gyeonggi-do (KR); Dae Hoon Jang, Gyeonggi-do (KR); Young Hoon Cha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/817,695

(22) Filed: Mar. 13, 2020

(65) Prior Publication Data

US 2021/0064292 A1    Mar. 4, 2021

(30) Foreign Application Priority Data

Aug. 27, 2019    (KR) .......................... 10-2019-0105431

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,977,627 B1* | 5/2018 | Hung | ..................... | G06F 3/0659 |
| 2014/0137128 A1* | 5/2014 | Chang | ................... | G06F 9/4881 |
| | | | | 718/103 |
| 2018/0182463 A1* | 6/2018 | Dutta | ..................... | G11C 16/26 |
| 2019/0179698 A1* | 6/2019 | Liu | ........................ | G06F 3/0614 |

FOREIGN PATENT DOCUMENTS

| | | |
|---|---|---|
| KR | 10-2011-0092047 | 8/2011 |
| KR | 10-2018-0029124 | 3/2018 |

* cited by examiner

*Primary Examiner* — Farley Abad
*Assistant Examiner* — Dayton Lewis-Taylor
(74) *Attorney, Agent, or Firm* — IP & T Group LLP

(57) ABSTRACT

Embodiments of the present disclosure relate to a memory system, a memory controller, and an operation method. The present disclosure may divide user data and map data corresponding to the user data into data segments, may input the data segments in N virtual die queues, and may program the same in a memory device, wherein a user data segment input in the virtual die queue is programmed according to two program schemes, thereby quickly programming the user data and the map data in the memory device and quickly updating the map data in a map cache.

19 Claims, 17 Drawing Sheets

FIG.11

| WL | memory cell | Program Order ||
| --- | --- | --- | --- |
| | | 1ST PGM | 2ND PGM |
| WL_0 | cell_1 | 1 | 9 |
| | cell_2 | 2 | 10 |
| | cell_3 | 3 | 11 |
| | cell_4 | 4 | 12 |
| WL_1 | cell_1 | 5 | 17 |
| | cell_2 | 6 | 18 |
| | cell_3 | 7 | 19 |
| | cell_4 | 8 | 20 |
| WL_2 | cell_1 | 13 | 25 |
| | cell_2 | 14 | 26 |
| | cell_3 | 15 | 27 |
| | cell_4 | 16 | 28 |
| WL_3 | cell_1 | 21 | 33 |
| | cell_2 | 22 | 34 |
| | cell_3 | 23 | 35 |
| | cell_4 | 24 | 36 |

MEMORY SYSTEM, MEMORY CONTROLLER, AND OPERATION METHOD

CROSS REFERENCE TO RELATED APPLICATION

The present application claims priority under 35 U.S.C. 119(a) to Korean patent application number 10-2019-0105431, filed in the Korean intellectual property office on Aug. 27, 2019, which is incorporated herein by reference in its entirety.

BACKGROUND OF THE INVENTION

1. Field of the Invention

Embodiments of the present disclosure relate to a memory system, a memory controller, and an operation method.

2. Description of the Prior Art

A memory system stores data on the basis of requests of a host, such as a computer, a mobile terminal (e.g., a smart phone or a tablet computer), or any of a variety of other electronic devices. The memory system may include a device for storing data in a magnetic disk (e.g., hard disk drive (HDD)) or a device for storing data in a nonvolatile memory (e.g., solid state drive (SSD), a universal flash storage (UFS) device, an embedded MMC (eMMC) device, or the like).

The memory system may further include a memory controller for controlling the associated memory device. The memory controller may receive a command from a host, and may execute or control, on the basis of the received command, operations for reading data from, writing data to, or erasing data from, the memory. Further, the memory controller may drive firmware for performing a logical operation for executing or controlling the operations.

As the storage capacity of a memory system has increased, so too has the need for the memory system to quickly process a mass-data write operation requested by a host, as well as an additional operation (e.g., an operation for updating map data in a map cache) necessary for such a mass-data write operation.

SUMMARY

Embodiments of the present disclosure may provide a memory system, a memory controller, and an operation method, which can quickly program user data and map data in a memory device.

Further, embodiments of the present disclosure may provide a memory system, a memory controller, and an operation method, which, when programming user data and map data in a memory device, can quickly update the map data in a map cache.

In one aspect, embodiments of the present disclosure may provide a memory system including: a memory device, which includes multiple dies and multiple memory blocks disposed in the multiple memory dies; and a memory controller.

The memory controller may divide user data corresponding to a command received from a host into user data segments.

The memory controller may divide map data corresponding to the user data into map data segments.

The memory controller may enqueue a first user data segment among the user data segments and a first map data segment among the map data segments in a selected virtual die queue among N virtual die queues, where N is a natural number of 2 or more.

The memory controller may enqueue user data segments and map data segments in the N virtual die queues in a striping scheme.

The memory controller may program the first user data segment and the first map data segment in a memory block in one of the multiple memory dies included in the memory device.

The memory controller may program, according to a first program scheme, all or a part of the first user data segment in memory cells connected to a first word line among multiple word lines in the memory device, and then may program all or part of the first user data segment programmed in the first program scheme in the memory cells connected to the first word line in a second program scheme.

The threshold voltage distribution of memory cells programmed according to the first program scheme is wider than the threshold voltage distribution of memory cells programmed according to the second program scheme.

The memory controller may program, according to the first program scheme, data different from the first user data segment in memory cells connected to a second word line among the word lines in the memory device between a first time and a second time.

At the first time, the memory controller programs all or part of the first user data segment in the memory cells connected to the first word line according to the first program scheme.

At the second time, the memory controller programs all or part of the first user data segment in the memory cells connected to the first word line according to the second program scheme.

The memory controller may program the first map data segment in the memory device before programming the first user data segment, regardless of order in which the first map data segment and first user data segment are enqueued in the selected virtual die queue.

The memory controller may update the first map data segment in a map cache after the first user data segment is programmed in the memory device according to the second program scheme.

In another aspect, embodiments of the present disclosure may provide a memory controller including: a memory interface configured to communicate with a memory device which includes multiple memory dies including the multiple memory blocks; and a control circuit.

The control circuit may divide user data corresponding to a command received from a host into user data segments.

The control circuit may divide map data corresponding to the user data into map data segments.

The control circuit may enqueue a first user data segment among the user data segments and a first map data segment among the map data segments in a selected virtual die queue among N virtual die queues, where N is a natural number of 2 or more.

The control circuit may enqueue the user data segments and the map data segments in the N virtual die queues in a striping scheme.

The control circuit may program the first user data segment and the first map data segment in a memory block in one of the multiple memory dies in the memory device.

The control circuit may program, according to a first program scheme, all or a part of the first user data segment in memory cells connected to a first word line among multiple word lines in the memory device, and then may program all or part of the first user data segment programmed according the first program scheme in the memory cells connected to the first word line according to a second program scheme.

The threshold voltage distribution of memory cells programmed according to the first program scheme is wider than the threshold voltage distribution of memory cells programmed according to the second program scheme.

The control circuit may program, according to the first program scheme, data different from the first user data segment in memory cells connected to a second word line among the word lines in the memory device between a first time and a second time.

At the first time, the control circuit programs all or part of the first user data segment in the memory cells connected to the first word line according to the first program scheme.

At the second time, the control circuit programs all or part of the first user data segment in the memory cells connected to the first word line according to the second program scheme.

The control circuit may program the first map data segment in the memory device before programming the first user data segment, regardless of order in which the first map data segment and the first user data segment are enqueued in the selected virtual die queue.

The control circuit may update the first map data segment in a map cache after the first user data segment is programmed in the memory device according to the second program scheme.

In another aspect, embodiments of the present disclosure may provide an operation method of a memory controller configured to control a memory device which includes multiple memory dies including multiple memory blocks.

The operation method of the memory controller may include dividing user data corresponding to a command received from a host into user data segments.

The operation method of the memory controller may include dividing map data corresponding to the user data into map data segments.

The operation method of the memory controller may include enqueuing, in a selected virtual die queue among N virtual die queues, a first user data segment among the user data segments and a first map data segment corresponding to the first user data segment among the map data segments, where N is a natural number of 2 or more.

The operation method of the memory controller may include programming the first user data segment and the first map data segment in a memory block in one of the multiple memory dies.

All or a part of the first user data segment may be programmed, according to a first program scheme, in memory cells connected to a first word line among word lines included in the memory device, and then may be programmed in the memory cells connected to the first word line according to a second program scheme.

In another aspect, embodiments of the present disclosure may provide a memory system including a memory device and a controller.

The controller may control the memory device to store a map data segment and then to store a user data segment corresponding to the map data segment.

The controller may update, after the user data segment is stored, a cached map data segment according to the storage of the map data segment.

The memory device stores the user data segment through a foggy-fine program scheme.

According to embodiments of the present disclosure, user data and map data may be quickly programmed in a memory device.

Further, according to embodiments of the present disclosure, when programmed in the memory device, the user date and the map data may be quickly updated in a map cache.

BRIEF DESCRIPTION OF THE DRAWINGS

The above and other aspects, features, and advantages of the present disclosure will be more apparent from the following detailed description taken in conjunction with the accompanying drawings, in which:

FIG. 11 is a table illustrating an example of the order in which data is programmed in memory cells on the basis of the operation illustrated in FIGS. 9 and 10.

DETAILED DESCRIPTION

Embodiments of the present disclosure are described in detail below with reference to the accompanying drawings. Throughout the specification, reference to "an embodiment" or the like is not necessarily to only one embodiment, and different references to any such phrase are not necessarily to the same embodiment(s).

Figure 1:
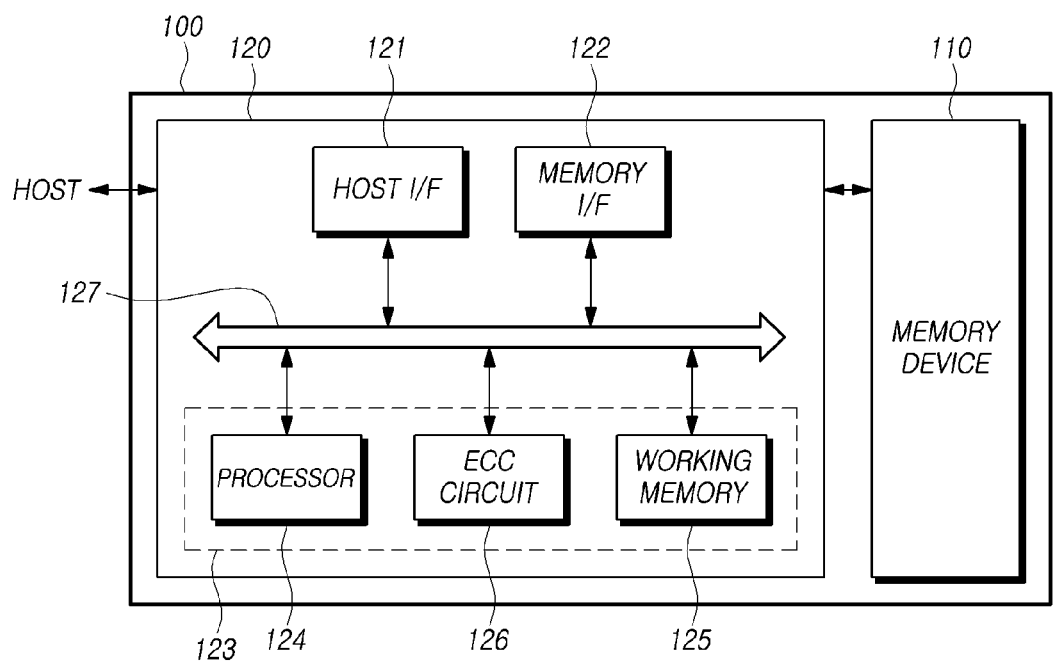
FIG. 1 schematically illustrates a configuration of a memory system according to an embodiment of the present disclosure.

FIG. 1 schematically illustrates a configuration of a memory system 100 according to an embodiment of the present disclosure.

Referring to FIG. 1, the memory system 100 may include a memory device 110 configured to store data and a memory controller 120 configured to control the memory device 110.

The memory device 110 includes multiple memory blocks and operates in response to control of the memory controller 120. An operation of memory device 110 may include a read operation, a program operation (also referred to as a "write operation"), and an erasure operation.

The memory device 110 may include a memory cell array including multiple memory cells (briefly referred to as "cells") configured to store data. The memory cell array may be present in each memory block.

For example, the memory device 110 may be implemented by any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (SU-RAM).

The memory device 110 may be configured as a three-dimensional array structure. Embodiments of the present disclosure may be applied to a charge trap flash (ITF), in which a charge storage layer is formed as an insulation film, in addition to a flash memory device in which a charge storage layer is formed as a conductive floating gate.

The memory device 110 is configured to receive a command and an address from the memory controller 120 and to access a region selected by the address from among the memory cell array. That is, the memory device 110 may perform an operation corresponding to the command with respect to the region selected by the address.

For example, the memory device 110 may perform a program operation, a read operation, and an erasure operation. During the program operation, the memory device 110 programs data in the region selected by the address. During the read operation, the memory device 110 reads data from the region selected by the address. During the erasure operation, the memory device 110 erases data stored in the region selected by the address.

The memory controller 120 may control a write (program) operation, a read operation, an erasure operation, and a background operation for the memory device 110. The background operation may include, as an example, a garbage collection (GC), a wear levelling (WL), or a bad block management (BBM).

The memory controller 120 may control an operation of the memory device 110 in response to a request of a host (HOST). In contrast, the memory controller 120 may also control an operation of the memory device 110 regardless of the request of the host.

The memory controller 120 and the host may be separate device. Alternatively, the memory controller 120 and the host may be combined into a single device. In the description below, by way of example, the memory controller 120 and the host are separate devices.

Referring to FIG. 1, the memory controller 120 may include a memory interface 122 and a control circuit 123, and may further include a host interface 121.

The host interface 121 provides an interface for communication with the host.

The control circuit 123 may receive a command from the host through the host interface 121, and may process the received command.

The memory interface 122 is connected to the memory device 110 and provides an interface for communication with the memory device 110. That is, the memory interface 122 may be configured to provide an interface for the memory device 110 and the memory controller 120 in response to a control of the control circuit 123.

The control circuit 123 may be the operative component of the memory controller 120 to control an operation of the memory device 110. To this end, for example, the control circuit 123 may include a processor 124 and/or a working memory 125. In an embodiment, the control circuit 123 may further include an error detection and correction circuit (ECC circuit) 126.

The processor 124 may perform a logical operation. The processor 124 may communicate with the host through the host interface 121, and may communicate with the memory device 110 through the memory interface 122.

The processor 124 may function as a flash translation layer (FTL). The processor 124 may translate a logical block address (LBA) provided by the host into a physical block address (PBA) through a flash translation layer (FTL). The flash translation layer (FTL) may use a mapping table to receive the logical block address (LBA) and translate the same into the physical block address (PBA).

The FTL may use any of multiple address mapping methods depending on a mapping unit. Representative address mapping methods are a page mapping method, a block mapping method, and a hybrid mapping method.

The processor 124 is configured to randomize data received from the host. For example, the processor 124 may randomize data received from the host using a randomizing seed. The randomized data are provided to the memory device 110 as data to be stored, and are programmed in a memory cell array.

The processor 124 is configured to derandomize data received from the memory device 110 during a read operation. For example, the processor 124 will derandomize data received from the memory device 110 by using a derandomizing seed. The derandomized data will be output to the host.

The processor 124 may execute firmware to control an operation of the memory controller 120. In other words, the processor 124 may execute (drive) firmware loaded in the working memory 125 during booting in order to perform a logical operation.

The firmware is a program executed in the memory system 100 and may include various functional layers.

For example, the firmware may include one or more of a flash translation layer (FTL) configured to perform translation between a physical address of the memory device 110 and a logical address; a host interface layer (HIL) configured to interpret a command from the host and to transfer the same to the flash translation layer (FTL); and a flash interface layer (FIL) configured to transfer a command instructed by the flash translation layer (FTL) to the memory device 110.

The firmware may be, for example, stored in the memory device 110 and then loaded in the working memory 125.

The working memory 125 may store firmware, program codes, commands, or data to drive the memory controller 120. The working memory 125 is, for example, a volatile memory, and may include static RAM (SRAM), dynamic RAM (DRAM), and/or synchronous DRAM (SDRAM).

The error detection and correction circuit 126 may configured to detect error bit(s) of data identified, using an error correction code, and to correct the detected error bit(s). The error-containing data may be stored in the working memory 125 or data read from the memory device 110.

The error detection and correction circuit 126 may be implemented to decode data by the error correction code. The error detection and correction circuit 126 may be implemented as any of various code decoders. For example, a decoder for performing unsystematic code decoding or a decoder for performing systematic code decoding may be used.

For example, the error detection and correction circuit 126 may detect an error bit in the units of sector with respect to each of read data. That is, each of read data may include multiple sectors. A sector may refer to a data unit smaller than a page which is a read unit of a flash memory. Sectors constituting each of read data may correspond to each other via an address.

The error detection and correction circuit 126 may calculate a bit error rate (BER) and may determine whether correction can be made in units of sector. For example, the error detection and correction circuit 126 determines that a relevant sector is uncorrectable or fails when the bit error rate (BER) is larger than a reference value. On the other hand, when the bit error rate (BER) is lower than the reference value, the relevant sector is determined to be correctable or pass.

The error detection and correction circuit 126 may sequentially detect and correct errors with respect to all read data. When a sector included in the read data is correctable, the error detection and correction circuit 126 may omit an error detection and correction operation for a relevant sector with respect to next read data. In this way, when error detection and correction operations for all read data are finished, the error detection and correction circuit 126 may detect a sector which has been determined to be uncorrectable to the last. One or more sectors may be determined to be uncorrectable. The error detection and correction circuit 126 may transfer information (e.g., address information) regarding the sector determined to be uncorrectable to the processor 124.

A bus 127 may be configured to provide a channel between constituent elements 121, 122, 124, 125, and 126 of the memory controller 120. The bus 127 may include, for example, a control bus for transferring various types of control signals and commands, and a data bus for transferring various types of data.

The elements of the memory controller 120 shown in FIG. 1 are merely examples. Some of the these elements may be omitted. Alternatively, two or more these elements may be combined into one. Of course, the memory controller 120 may include additional elements.

A more detailed description of the memory device 110 is given below with reference to FIG. 2.

Figure 2:
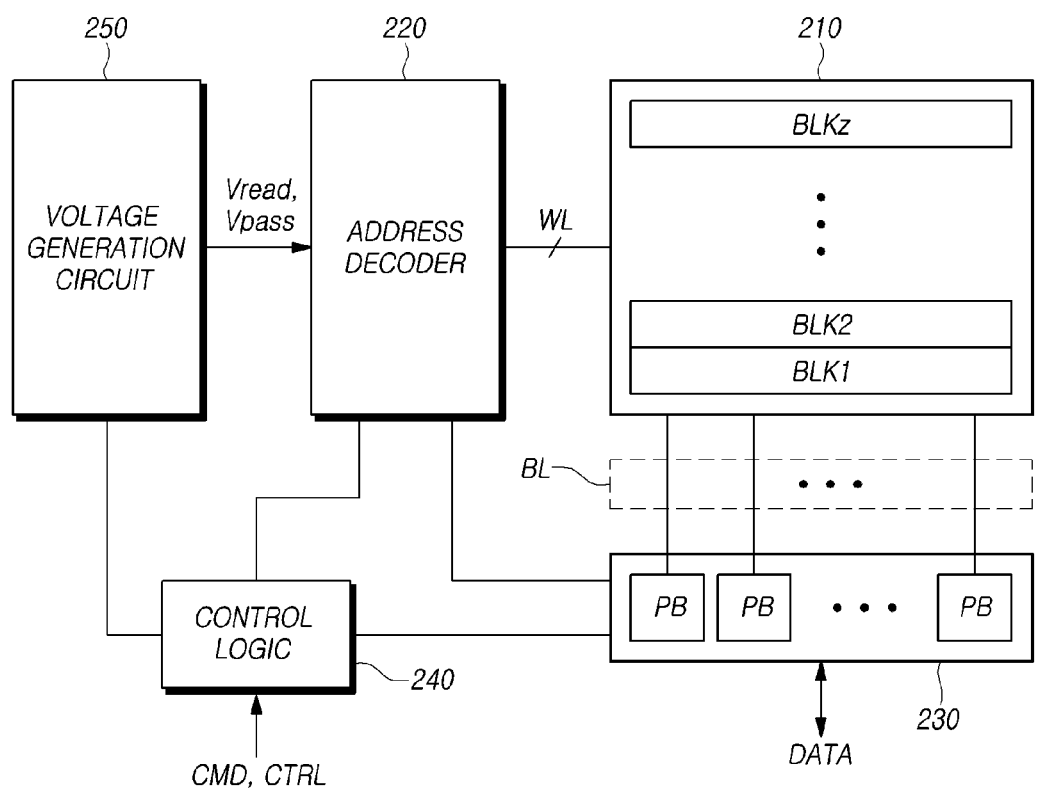
FIG. 2 is a block diagram schematically illustrating a memory device according to an embodiment of the present disclosure.

FIG. 2 is a block diagram schematically illustrating the memory device 110 according to an embodiment of the present disclosure.

Referring to FIG. 2, the memory device 110 may include a memory cell array 210, an address decoder 220, a read-and-write circuit 230, control logic 240, and a voltage-generation circuit 250.

The memory cell array 210 may include multiple memory blocks BLK1 to BLKz (z is a natural number greater than or equal to 2).

In each of the multiple memory blocks BLK1 to BLKz, multiple word lines (WLs) and multiple bit lines (BLs) may be arranged, and multiple memory cells (MCs) may be arranged.

The multiple memory blocks BLK1 to BLKz may be connected to the address decoder 220 through the multiple word lines (WLs). The multiple memory blocks BLK1 to BLKz may be connected to the read-and-write circuit 230 through the multiple bit lines (BLs).

Each of the multiple memory blocks BLK1 to BLKz may include multiple memory cells. For example, the multiple memory cells are nonvolatile memory cells, and may be formed as nonvolatile memory cells having a vertical channel structure.

The memory cell array 210 may have a two-dimensional structure, or a three-dimensional structure.

Each of multiple memory cells included in the memory cell array 210 may store at least one bit of data. As one example, each of the multiple memory cells in the memory cell array 210 may be a single-level cell (SLC) configure to store one bit of data. As another example, each of the multiple memory cells in the memory cell array 210 may be a multi-level cell (MLC) configured to store two bits of data. As another example, each of the multiple memory cells in the memory cell array 210 may be a triple-level cell (TLC) configured to store three bits of data. As another example, each of the multiple memory cells included in the memory cell array 210 may be a quad-level cell (QLC) configured to store four bits of data. As another example, the memory cell array 210 may include multiple memory cells each configured to store five or more bits of data, respectively.

Referring to FIG. 2, the address decoder 220, the read-and-write circuit 230, the control logic 240, and the voltage-generation circuit 250 may collectively operate as a peripheral circuit for driving the memory cell array 210.

The address decoder 220 may be connected to the memory cell array 210 through the multiple word lines (WLs).

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage-generation circuit 250.

When a read-voltage application operation is performed during a read operation, the address decoder 220 may apply a read voltage Vread to a selected word line (WL) in the selected memory block, and may apply a pass voltage Vpass to the remaining unselected word lines (WLs).

During a program verification operation, the address decoder 220 may apply a verification voltage generated by the voltage-generation circuit 250 to the selected word line (WL) in the selected memory block, and may apply a pass voltage Vpass to the remaining unselected word lines (WLs).

The address decoder 220 may be configured to decode a column address among the received addresses. The address decoder 220 may transmit the decoded column address to the read-and-write circuit 230.

A read operation and a program operation of the memory device 110 may be performed in a page unit. An address received at the time of request for the read operation and the program operation may include a block address, a row address and/or a column address.

The address decoder 220 may select one memory block and one word line according to the block address and the row address. The column address may be decoded by the address decoder 220 and then may be provided to the read-and-write circuit 230.

The address decoder 220 may include a block decoder, a row decoder, a column decoder, and/or an address buffer.

The read-and-write circuit 230 may include multiple page buffers (PBs). The read-and-write circuit 230 may operate as a "read circuit" during a read operation of the memory cell array 210, and may operate as a "write circuit" during a write operation thereof.

The read-and-write circuit 230 is also referred to as a data register circuit or a page buffer circuit including multiple page buffers (PBs). The read-and-write circuit 230 may include a data buffer having a data processing function, and, according to circumstances, may additionally include a cache buffer having a cashing function.

The multiple page buffers (PBs) may be connected to the memory cell array 210 through the multiple bit lines (BLs). During the read operation and the program verification operation, in order to sense the threshold voltage Vth of memory cells, the multiple page buffers (PBs) may continuously supply a sensing electric current to bit lines (BLs) connected the memory cells and cuncurrently sense, through a sensing node, a change in the amount of electric current flowing depending on the programmed state of the corresponding memory cells, thereby latching the same as sensing data.

The read-and-write circuit 230 may operate in response to page buffer control signals output from the control logic 240.

During the read operation, the read-and-write circuit 230 senses data of the memory cells, temporarily stores the read data, and then outputs the data (DATA) to an input/output buffer of the memory device 110. As an example, the read-and-write circuit 230 may include a column selection circuit rather than the page buffers (PBs) or the page registers.

The control logic 240 may be connected to the address decoder 220, the read-and-write circuit 230, and the voltage-generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the pre-charge potential level of a sensing node of the multiple page buffers (PBs).

The control logic 240 may control the read-and-write circuit 230 to perform a read operation of the memory cell array 210. The voltage-generation circuit 250 may generate a read voltage Vread and a pass voltage Vpass to be used during the read operation in response to a voltage-generation circuit control signal output from the control logic 240.

Figure 3:
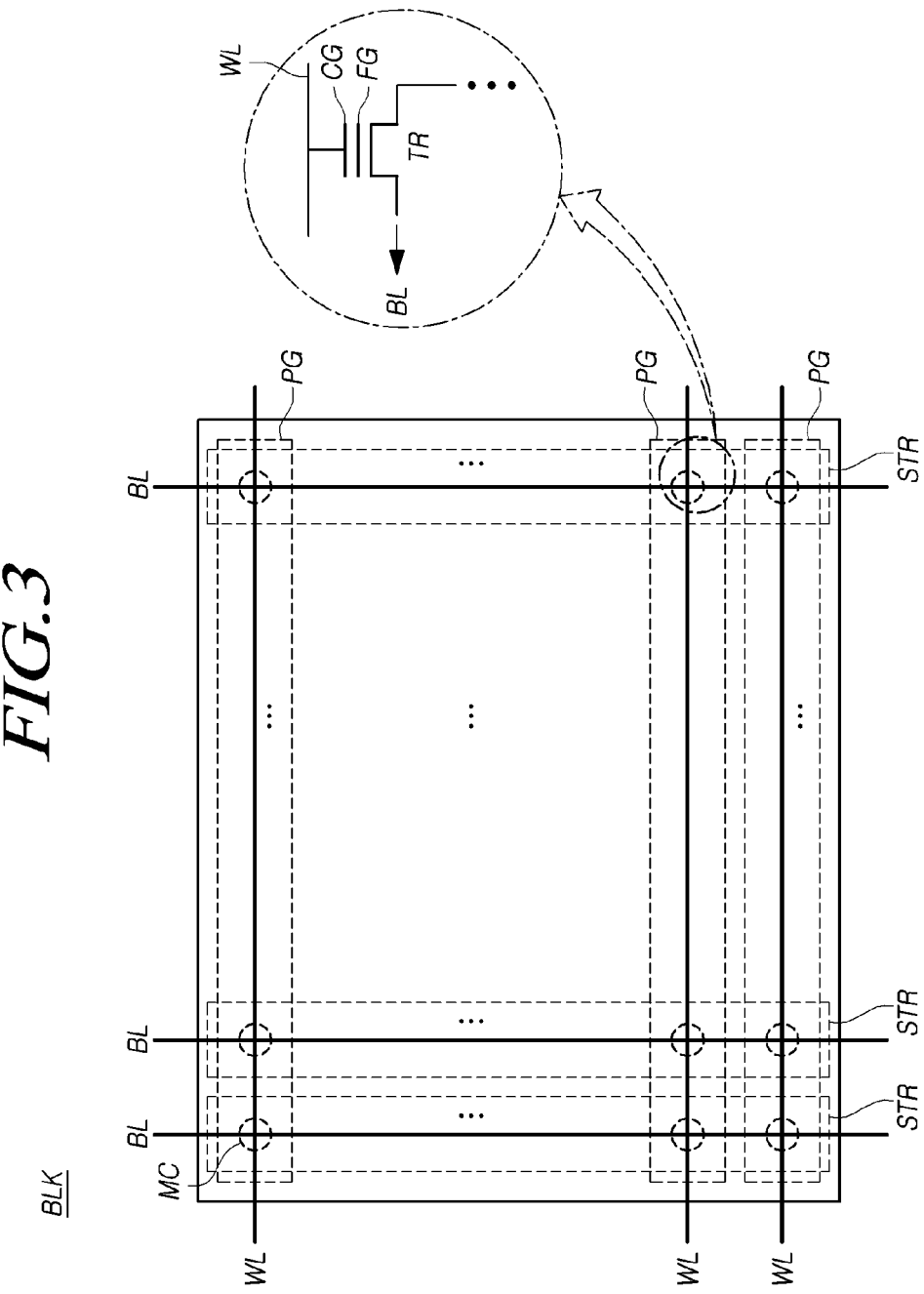
FIG. 3 schematically illustrates a representative memory block of a memory device according to an embodiment of the present disclosure.

FIG. 3 schematically illustrates a representative memory block BLK of the memory device 110 according to an embodiment of the present disclosure.

Referring to FIG. 3, a memory block BLK included in the memory device 110 may be disposed, for example, such that multiple pages (PGs) and multiple strings (STRs) are arranged in an intersecting pattern, as shown in FIG. 3.

The multiple pages (PGs) correspond to multiple lines (WLs), and the multiple strings (STRs) correspond to multiple bit lines (BLs).

In the memory block BLK, multiple word lines (WLs) and multiple bit lines (BLs) may be arranged in an intersecting pattern. For example, each of the multiple word lines (WLs) may be disposed in a row direction, and each of the multiple bit lines (BLs) may be disposed in a column direction. As another example, each of the multiple word lines (WLs) may be disposed in a column direction, and each of the multiple bit lines (BLs) may be disposed in a row direction.

The multiple word lines (WLs) and the multiple bit lines (BLs) cross each other so that multiple memory cells (MCs) can be defined, one at each intersection. A transistor TR may be disposed in each memory cell (MC).

For example, the transistor TR disposed in each memory cell (MC) may include a drain, a source, and a gate. The drain (or source) of the transistor TR may be connected to a corresponding bit line (BL) directly or via another transistor TR. The source (or drain) of the transistor TR may be connected to a source line (a ground) directly or via another transistor TR. The gate of the transistor TR may include: a floating gate (FG) surrounded by an insulation substance; and a control gate (CG) to which a gate voltage is applied from a word line (WL).

In each of multiple memory blocks BLK1 to BLKz, a first selection line (which is also referred to as a source selection line or a drain selection line) may be disposed outside a first outermost word line adjacent to the read-and-write circuit 230, and a second selection line (which is also referred to a drain selection line or a source selection line) may be disposed outside the other (second) outermost word line.

In an embodiment, at least one dummy word line may be disposed between the first outermost word line and the first selection line. Further, at least one dummy word line may be disposed between the second outermost word line and the second selection line.

In the memory block structure as in FIG. 3, a read operation and a program operation (a write operation) may be performed in a page unit, and an erasure operation may be performed in a memory block unit.

Figure 4:
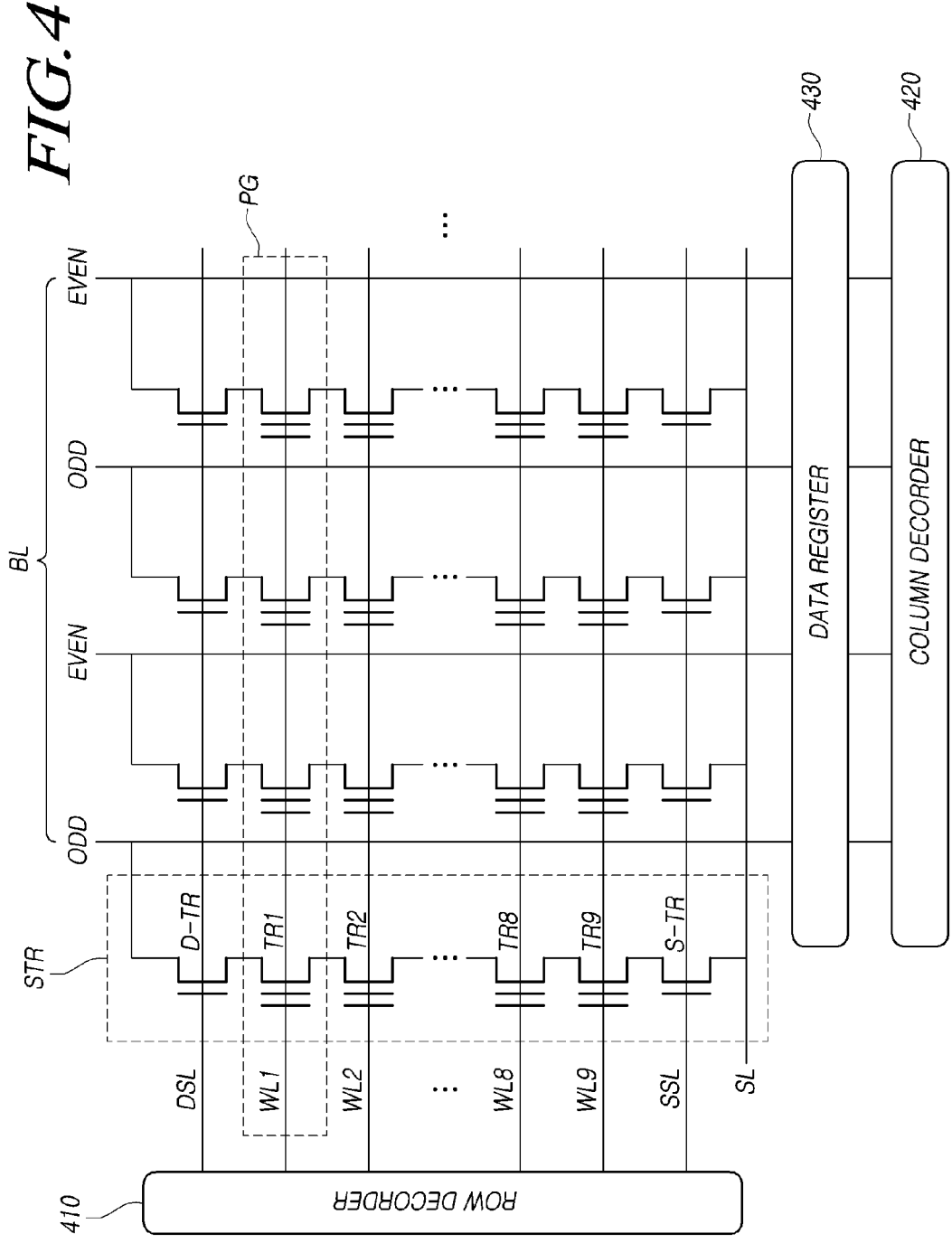
FIG. 4 illustrates a structure of a word line and a bit line of a memory device according to an embodiment of the present disclosure.

FIG. 4 illustrates a structure of a word line (WL) and a bit line (BL) of the memory device 110 according to an embodiment of the present disclosure.

Referring to FIG. 4, the memory device 110 includes a core region in which memory cells (MCs) are located; and an auxiliary region which is separate from the core region and supports an operation of the memory cell array 210.

The core region may include pages (PGs) and strings (STRs). In the core region, multiple word lines WL1 to WL9 and multiple bit lines (BLs) are arranged in an intersecting pattern.

The multiple word lines WL1 to WL9 may be connected to a row decoder 410, and the multiple bit lines (BLs) may be connected to a column decoder 420. A data register 430 corresponding to the read-and-write circuit 230 may be disposed between the multiple bit lines (BLs) and the column decoder 420.

The multiple word lines WL1 to WL9 correspond to multiple pages (PGs).

For example, as in FIG. 4, each of the multiple word lines WL1 to WL9 may correspond to one page PG. In contrast, when each of the multiple word lines WL1 to WL9 has a large size, each of the multiple word lines WL1 to WL9 may correspond to two or more (e.g. two or four) pages (PGs). A page PG is a minimum unit in performing the program operation and the read operation. During the program operation and the read operation, all memory cells (MCs) in the same page PG may perform operations simultaneously.

The multiple bit lines (BLs) are divided into odd-numbered bit lines (BLs) and even-numbered bit lines (BLs), and may be connected to the column decoder 420.

In order to access a memory cell (MC), an address may enter the core region through the row decoder 410 and the column decoder 420 via an input/output terminal, and may designate a target memory cell into which data is to be programmed or from which data is to be read. The target memory cell may be at the intersection of a bit line and word line indicated the address.

A page PG in a first direction (e.g., X-axis direction) is tied to a commonly used line, a word line (WL), and a string STR in a second direction (e.g., Y-axis direction) is also tied (connected) to a common line, a bit line BL. Being commonly tied means that a connection is made by the same material and, when a voltage is applied thereto, the same voltage is simultaneously applied. Of course, in relation to an intermediate or last memory cell (MC) connected in series, due to the voltage drop of a previous memory cell (MC), voltages applied to a first memory cell (MC) and a last memory cell (MC) may be slightly different.

In data processing of the memory device 110, since programming and reading are performed via the data register 430, the data register 430 plays a key role. When the data processing of the data register 430 is delayed, all other regions are required to wait until the data register 430 finishes data processing. Further, when the performance of the data register 430 is degraded, overall performance of the memory device 110 may be degraded.

Referring to the example in FIG. 4, one string STR may include multiple transistors TR1 to TR9 connected to the multiple word lines WL1 to WL9, respectively. Regions in which the multiple transistors TR1 to TR9 are present correspond to memory cells (MCs), respectively. Each of the multiple transistors TR1 to TR9 includes a control gate (CG) and a floating gate (FG), as described above.

The multiple word lines WL1 to WL9 include two outermost word lines WL1 and WL9. A first selection line DSL may be disposed outside a first outermost line WL1 adjacent to the data register 430, and a second selection line SSL may be disposed outside a second outermost word line WL9.

A first selection transistor D-TR, on-off of which is controlled by the first selection line DSL, has only a gate electrode connected to the first selection line DSL and does not include a floating gate (FG). A second selection transistor S-TR, on-off of which is controlled by the second selection line SSL, has only a gate electrode connected to the second selection line SSL and does not include a floating gate FG.

The first selection transistor D-TR serves as a switch configured to switch on or off connection between a corresponding string STR and the data register 430. The second selection transistor S-TR serves as a switch configured to switch on or off connection between the corresponding string STR and a source line (SL). That is, the first selection transistor D-TR and the second selection transistor S-TR are disposed at opposite ends of the corresponding string STR and serve as a gatekeeper configured to connect or disconnect a signal.

Since a target memory cell (MC) of a bit line (BL) to be programmed should be filled with electrons at the time of a program operation, the memory system 100 applies a set turn-on-voltage (Vcc) to a gate electrode of the first selection transistor D-TR to turn on the first selection transistor D-TR, and applies a set turn-off voltage (e.g., 0V) to a gate electrode of the second selection transistor S-TR to turn off the second selection transistor S-TR.

During a read operation or a verification operation, the memory system 100 turns on both the first selection transistor D-TR and the second selection transistor S-TR. Therefore, since electric current passes through the corresponding string STR and escapes to the source line (SL) which is ground, a voltage level of the bit line (BL) can be measured. However, during the read operation, there may be a time difference between on-off timing of the first selection transistor D-TR and on-off timing of the second selection transistor S-TR.

During an erasure operation, the memory system 100 may supply a set voltage (e.g. +20V) to a substrate through the source line (SL). During the erasure operation, the memory system 100 floats both the first selection transistor D-TR and the second selection transistor S-TR to generate infinite resistance. Therefore, the memory system 100 removes roles of the first selection transistor D-TR and the second selection transistor S-TR, and allows electrons to operate only between the floating gate (FG) and the substrate due to the potential difference.

Figure 5:
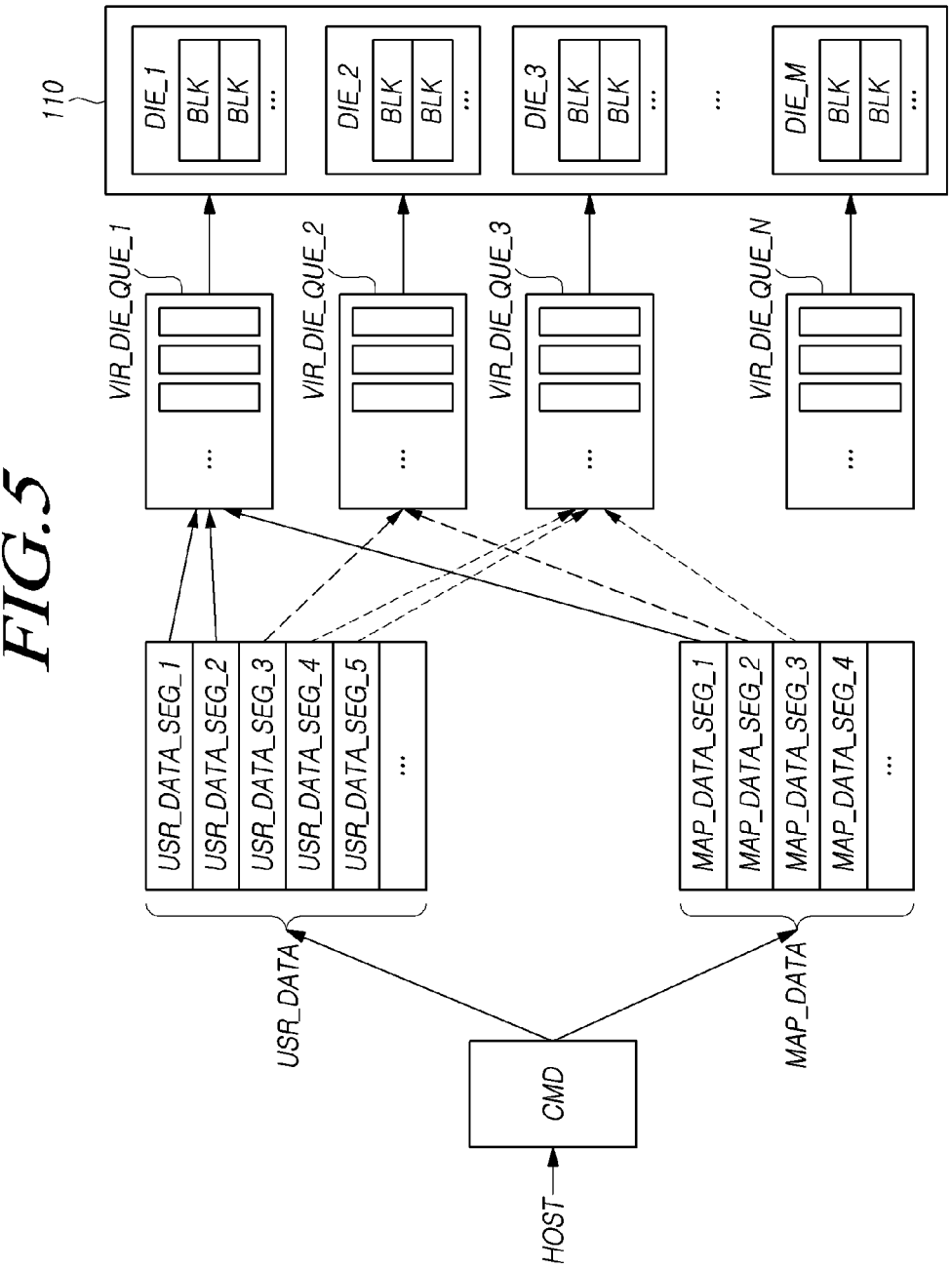
FIG. 5 illustrates storing user data and map data in a memory device in a memory system according to an embodiment of the present disclosure.

FIG. 5 illustrates storing user data and map data in the memory device 110 in the memory system 100 according to an embodiment of the present disclosure.

Referring to FIG. 5, the memory controller 120 of the memory system 100 may program (store), in the memory device 110, user data USR_DATA corresponding to a command CMD received from the host (HOST) and map data MAP_DATA corresponding to the user data USR_DATA.

The map data, MAP_DATA, corresponding to the user data USR_DATA includes mapping information regarding the user data USR_DATA, i.e., information which indicates a mapping relationship between a logical address of the user data USR_DATA (a logical block address) and a physical address of the user data USR_DATA (a physical block address).

The entirety, i.e., all, or a part of map data stored in the memory device 110 may be loaded in a map cache. The memory controller 120 first searches the map data loaded in the map cache for a value of a physical address corresponding to a targeted logical address, and, if no such value is found in the search, loads mapping information regarding the targeted logical address into the map cache from the memory device 110. In this instance, the map cache may be in the working memory 125 in the memory controller 120.

When the memory controller 120 programs the user data USR_DATA and the map data, MAP_DATA, in the memory device 110, the memory controller 120 may divide each of the user data USR_DATA and the map data MAP_DATA into one or more segments.

Specifically, the memory controller 120 may divide the user data USR_DATA into one or more user data segments, and may divide the map data MAP_DATA into one or more map data segments.

In FIG. 5, the user data USR_DATA are divided into user data segments (USR_DATA_SEG_1, USR_DATA_SEG_2, USR_DATA_SEG_3, USR_DATA_SEG_4, USR_

DATA_SEG_5, . . . ), and the map data MAP_DATA is divided into map data segments (MAP_DATA_SEG_1, MAP_DATA_SEG_2, MAP_DATA_SEG_3, MAP_DATA_SEG_4, . . . ).

Further, the memory controller 120 may program (store) the user data segments and the map data segments in the memory device 110.

When the user data segments and the map data segments are programmed in the memory device 110, the memory controller 120 may use a virtual die queue.

The memory controller 120 uses the virtual die queue to control the order in which the user data segments and the map data segments are stored in the memory device 110. In principle, because first-in-first-out (FIFO) is applied to the virtual die queue, the user data segments and the map data segments queued in the virtual die queue are stored in the memory device 110 in the order of input thereof in the virtual die queue. However, under a specific condition, the order of storing the user data segments and the map data segments in the memory device 110 may be changed.

Specifically, the memory controller 120 may enqueue user data segments and map data segments in N virtual die queues (VIR_DIE_QUE_1, VIR_DIE_QUE_2, VIR_DIE_QUE_3, . . . , VIR_DIE_QUE_N), where N is a natural number.

The memory controller 120 may enqueue at least one first user data segment among the user data segments and a first map data segment corresponding to the first user data segment among the map data segments in a first virtual die queue among the N virtual die queues (VIR_DIE_QUE_1, VIR_DIE_QUE_2, VIR_DIE_QUE_3, . . . , VIR_DIE_QUE_N). That is, the memory controller 120 may enqueue a user data segment and a corresponding map data segment in the same virtual die queue.

In FIG. 5, the memory controller 120 may enqueue, in a virtual die queue VIR_DIE_QUE_1, user data segments USER_DATA_SEG_1 and USER_DATA_SEG_2 and a map data segment MAP_DATA_SEG_1. The map data segment MAP_DATA_SEG_1 includes mapping information regarding the user data segments USER_DATA_SEG_1 and USER_DATA_SEG_2.

The memory controller 120 may enqueue a user data segment USER_DATA_SEG_3 and a map data segment MAP_DATA_SEG_2 in a virtual die queue VIR_DIE_QUE_2. The map data segment MAP_DATA_SEG_2 includes mapping information regarding the user data segment USER_DATA_SEG_3.

The memory controller 120 may enqueue user data segments USER_DATA_SEG_4 and USER_DATA_SEG_5 and a map data segment MAP_DATA_SEG_3 in a virtual die queue VIR_DIE_QUE_3. The map data segment MAP_DATA_SEG_3 includes mapping information regarding the user data segments USER_DATA_SEG_4 and USER_DATA_SEG_5.

As described above, when user data segments and map data segments are queued in N virtual die queues, the memory controller 120 may program user data segments and map data segments, which have been queued in different virtual die queues, in the memory device 110, in parallel.

However, the memory controller 120 may sequentially perform programming of a user data segment and a map data segment queued in the same virtual die queue.

In embodiments of the present disclosure, an example of a method for enqueueing user data segments and map data segments in N virtual die queues by the memory controller 120 is described with reference to FIG. 6 below.

Further, an example of a specific operation of programming a user data segment or a map data segment, which have been stored in one virtual die queue in the memory device 110 is described with reference to FIGS. 13 to 15 below.

The memory controller 120 may program a user data segment or a map data segment queued in one of the N virtual die queues in one of M memory dies (DIE_1, DIE_2, DIE_3, . . . , DIE_M) in the memory device 110, where M is a natural number greater than or equal to 2.

The number of virtual die queues, N, is not necessarily equal to the number of memory dies, M, in the memory device 110. Further, a user data segment and a map data segment queued in one virtual die queue are not necessarily stored on the same memory die. That is, a virtual die queue may span more than one memory die.

Each of the M memory dies (DIE_1, DIE_2, DIE_3, . . . , DIEM) may include multiple memory blocks (BLKs).

A memory block BLK in which a user data segment or a map data segments is programmed may include multiple memory cells, which may be connected to one of multiple word lines in the memory device 110.

Therefore, the memory controller 120 may program the user data segment or the map data segment queued in one of the N virtual die queues, in memory cells to be connected a first word line among word lines included in the memory device 110.

In this instance, the map data segment is programmed in a single-level cell (SLC). That is because, although the size of the map data segment is small, a fail in programming of the map data segment may have a large influence on the overall performance of the memory system 100, and an SLC is more reliable in this regard than a higher level cell.

On the other hand, the user data segment may be programmed not only in a single-level cell (SLC) but also in a multi-level cell (MLC), a triple-level cell (TLC), a quad-level cell (QLC), or the like. Moreover, such programming may be performed according to any of various program methods.

For example, in embodiments of the present disclosure, the memory controller 120 may program all or part of the above-mentioned first user data segment in memory cells connected to the first word line by using two different program methods.

That is, the memory controller 120 may program the entirety or part of the first user data segments in memory cells connected to a first word line among word lines in the memory device 110 according to the first program scheme and then according to a second program scheme after the entirety or part of the first user data segments in memory cells connected to the first word line is programmed according to the first program scheme. For example, the first and second program schemes may be foggy and fine program schemes, respectively. A memory cell may have an intended threshold voltage level or an intended program status with a sufficient read margin through both of the foggy and fine program schemes, which collectively represent a foggy-fine program scheme.

Hereinafter, an embodiment of the operation of the memory system 100, described in FIG. 5, is specifically described.

First, a method for enqueueing, by the memory controller 120 of the memory system 100, user data segments and map data segments in N virtual die queues to program the user data segments and the map data segments in the memory device 110 is described in detail.

Figure 6:
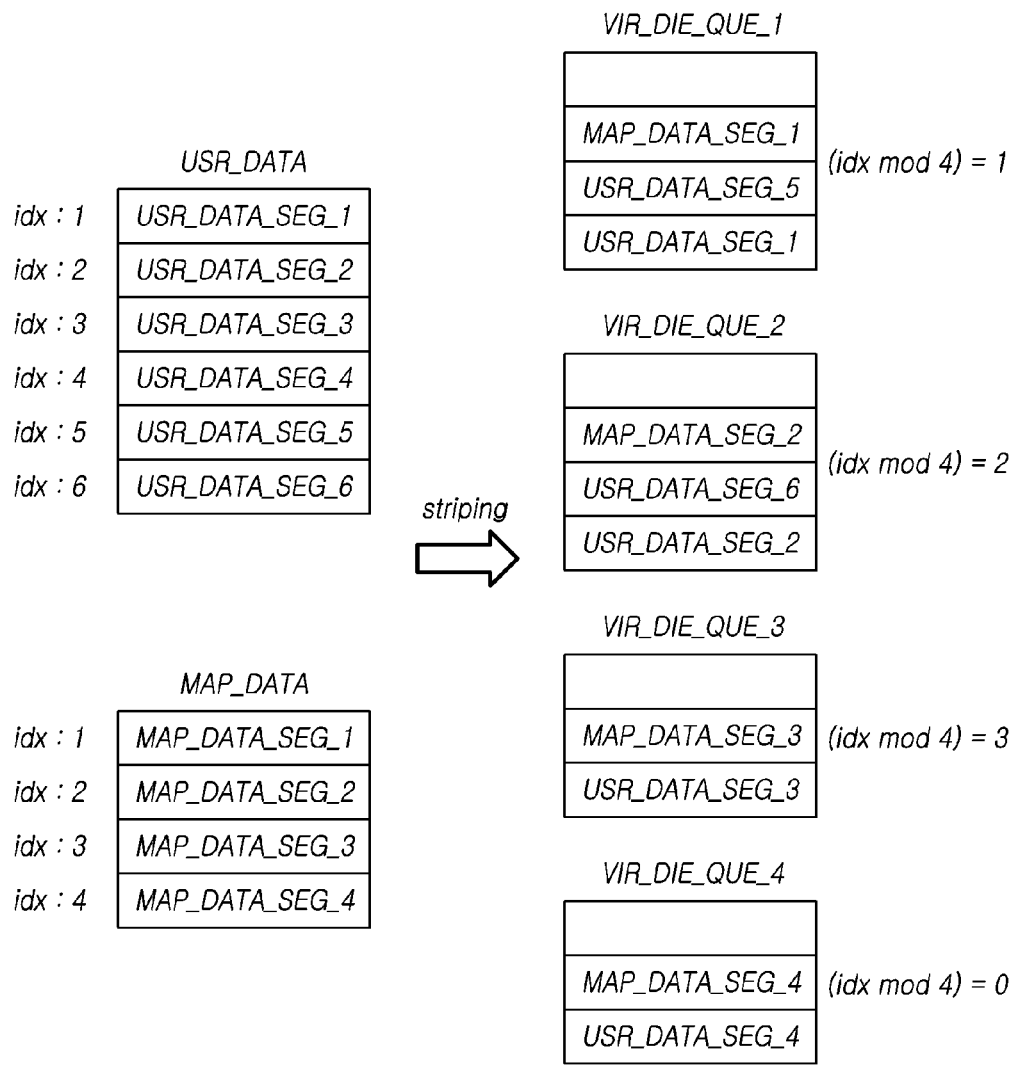
FIG. 6 illustrates enqueueing a user data segment and a map data segment in a virtual die queue in a striping scheme in a memory system according to an embodiment of the present disclosure.

FIG. 6 illustrates enqueueing a user data segment and a map data segment in a virtual die queue in a striping scheme in the memory system 100 according to an embodiment of the present disclosure.

The memory controller 120 of the memory system 100 may enqueue user data segments and map data segments in N virtual die queues in a striping scheme.

The striping scheme divides data into multiple segments, sequentially distributes the segments to multiple elements (e.g., memory dies), respectively, and then processes the same.

Any of various methods for distributing user data segments and map data segments to N virtual die queues by the memory controller 120 may be used. For example, the memory controller 120 may determine the distribution method according to the remainder after dividing indexes (idxs) of user data segments and map data segments by N, the number of virtual die queues. If the remainder is i, then the user data segment and the map data segment is distributed to virtual die queue corresponding to i.

In FIG. 6, it is assumed that user data, USR_DATA, are divided into user data segments USR_DATA_SEG_1, USR_DATA_SEG_2, USR_DATA_SEG_3, USR_DATA_SEG_4, and USR_DATA_SEG_5, USR_DATA_SEG_6, and indexes (idxs) of the user data segments USR_DATA_SEG_1, USR_DATA_SEG_2, USR_DATA_SEG_3, USR_DATA_SEG_4, USR_DATA_SEG_5, and USR_DATA_SEG_6 are 1, 2, 3, 4, 5, and 6, respectively.

Further, it is assumed that map data, MAP_DATA, corresponding to the user data USR_DATA are divided into map data segments MAP_DATA_SEG_1, MAP_DATA_SEG_2, MAP_DATA_SEG_3, and MAP_DATA_SEG_4, and indexes (idxs) of the map data segments MAP_DATA_SEG_1, MAP_DATA_SEG_2, MAP_DATA_SEG_3, and MAP_DATA_SEG_4 are 1, 2, 3, and 4, respectively.

It is also assumed that there are 4 (N=4) virtual die queues VIR_DIE_QUE_1, VIR_DIE_QUE_2, VIR_DIE_QUE_3, and VIR_DIE_QUE_4.

The memory controller 120 enqueues, in a virtual die queue VIR_DIE_QUE_1, user data segments USR_DATA_SEG_1 and USR_DATA_SEG_5 and a map data segment MAP_DATA_SEG_1, the indexes of which have a remainder of 1 when divided by 4.

Further, the memory controller 120 enqueues, in a virtual die queue VIR_DIE_QUE_2, user data segments USR_DATA_SEG_2 and USR_DATA_SEG_6 and a map data segment MAP_DATA_SEG_2, the indexes of which have a remainder of 2 when divided by 4.

Further, the memory controller 120 enqueues, in a virtual die queue VIR_DIE_QUE_3, a user data segment USR_DATA_SEG_3 and a map data segment MAP_DATA_SEG_3, the indexes of which have a remainder of 3 when divided by 4.

Lastly, the memory controller 120 enqueues, in a virtual die queue VIR_DIE_QUE_4, a user data segment USR_DATA_SEG_4 and a map data segment MAP_DATA_SEG_4, the indexes of which have a remainder of 0 when divided by 4.

In this way, the memory controller 120 can distribute user data segments and map data segments to N virtual die queues as equal as possible. Therefore, it is possible to prevent user data segments and map data segments from being queued in a specific virtual die queue in a concentrated manner and thus prevent the overall program performance of the memory system 100 from being degraded. Further, user data segments and map data segments queued in each virtual die queue may be processed in parallel and then may be programmed in the memory device 110. As a result, user data and map data may be quickly programmed in the memory device 110.

Hereinafter, in FIG. 7 and FIG. 8, an operation in which the memory controller 120 programs, in the memory device 110, a first user data segment queued in one of N virtual die queues, is described.

Figure 7:
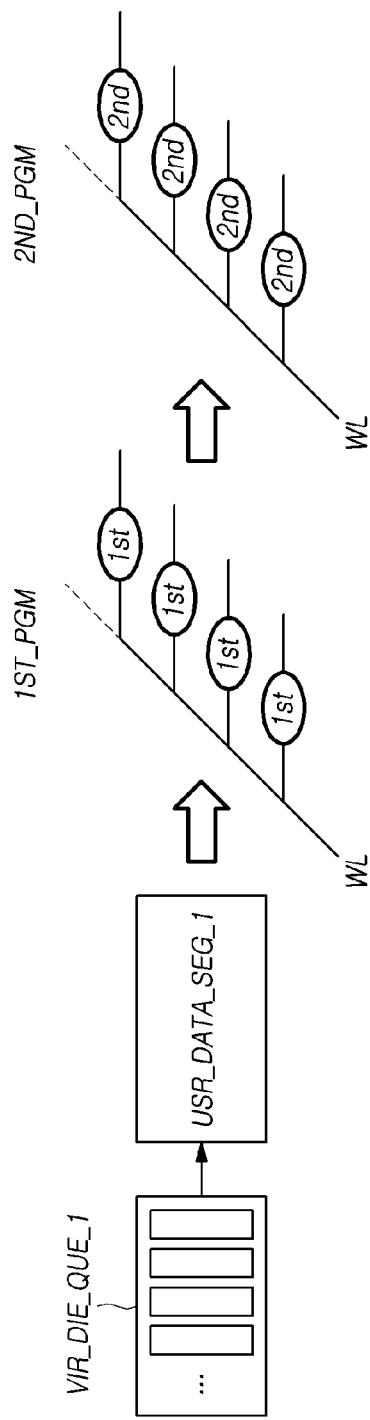
FIG. 7 illustrates programming a first user data segment in memory cells connected to a word line in a memory system according to an embodiment of the present disclosure.

FIG. 7 illustrates programming a first user data segment in memory cells connected to a word line (WL) in the memory system 100 according to an embodiment of the present disclosure.

First, the memory controller 120 of the memory system 100 extracts a first user data segment USER_DATA_SEG_1 from a virtual die queue VIR_DIE_QUE_1.

The memory controller 120 programs the first user data segment USER_DATA_SEG_1 in the memory cells connected to the word line (WL) according to a first program scheme 1ST_PGM.

Thereafter, the memory controller 120 programs the first user data segment USER_DATA_SEG_1 in the memory cells connected to the word line (WL) according to a second program scheme 2ND_PGM.

Figure 8:
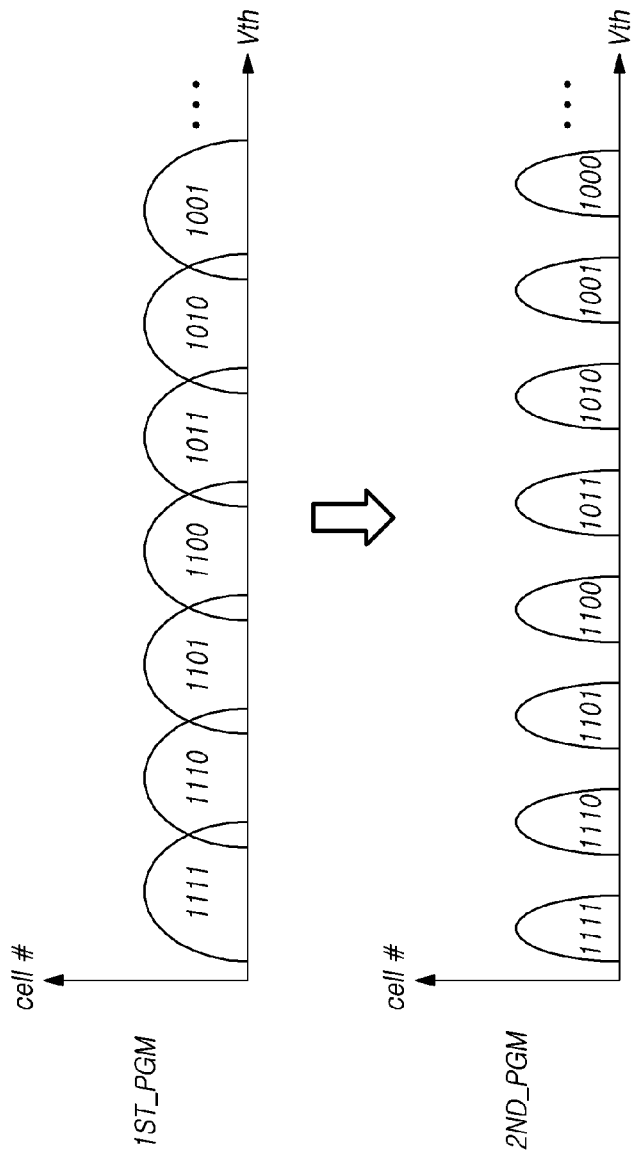
FIG. 8 illustrates a difference between a first program method and a second program method in a memory system according to an embodiment of the present disclosure.

FIG. 8 illustrates a difference between the first program method 1ST_PGM and the second program method 2ND_PGM in the memory system 100 according to an embodiment of the present disclosure.

FIG. 8 illustrates a case in which 4 bits of data are programmed in quad-level memory cells (QLCs).

Referring to FIG. 8, threshold voltage (Vth) distributions of memory cells programmed according to the first program scheme 1ST_PGM are wider than threshold voltage (Vth) distributions of memory cells programmed according to the second program scheme 2ND_PGM.

Therefore, since the threshold voltage (Vth) distributions of memory cells programmed according to the first program scheme 1ST_PGM are likely to overlap each other, a read fail is likely to occur in data stored in the memory cells programmed according to the first program scheme 1ST_PGM. However, the time required to program data in the memory cells according to the first program scheme 1ST_PGM is relatively short compared with a normal program operation.

When programmed according to the second program scheme after completion of the programming according to the first program scheme, the threshold voltage (Vth) distributions of memory cells becomes more spaced apart with good read margins, and thus are unlikely to overlap each other. A read fail is unlikely to occur in data stored in the memory cells programmed according to the second program scheme 2ND_PGM.

In FIG. 7 and FIG. 8, programming data in memory cells connected to one word line according to the first program scheme 1ST_PGM and then programming the same according to a second program scheme 2ND_PGM is described.

The reason for programming data in a memory cell is using two different program schemes, as described above, is that it takes a long time to program data to a multiple-bit storage memory cell (e.g., a triple-level cell (TLC), a quad-level cell (QLC)). When a program operation for memory cells connected to one word line takes a long time, a program operation for memory cells connected to another word line may be delayed.

Therefore, if programming data in the memory cells connected to one word line is spread into two steps, i.e., fast programming and fine programming, the delay in programming memory cells of plural word lines may be reduced.

Figure 9:
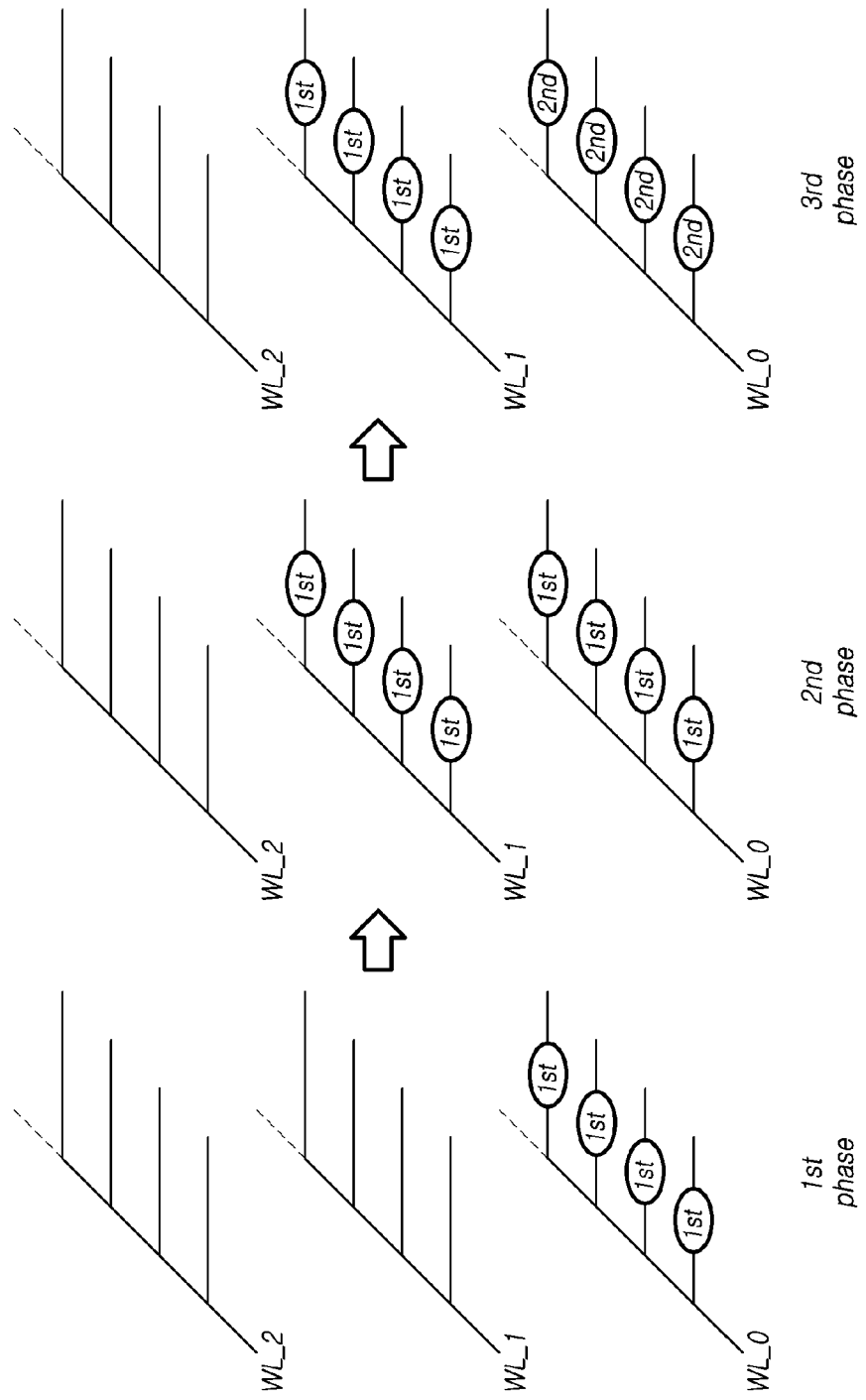
FIGS. 9 and 10 illustrate an example of programming data in memory cells in a memory system according to an embodiment of the present disclosure.
Figure 10:
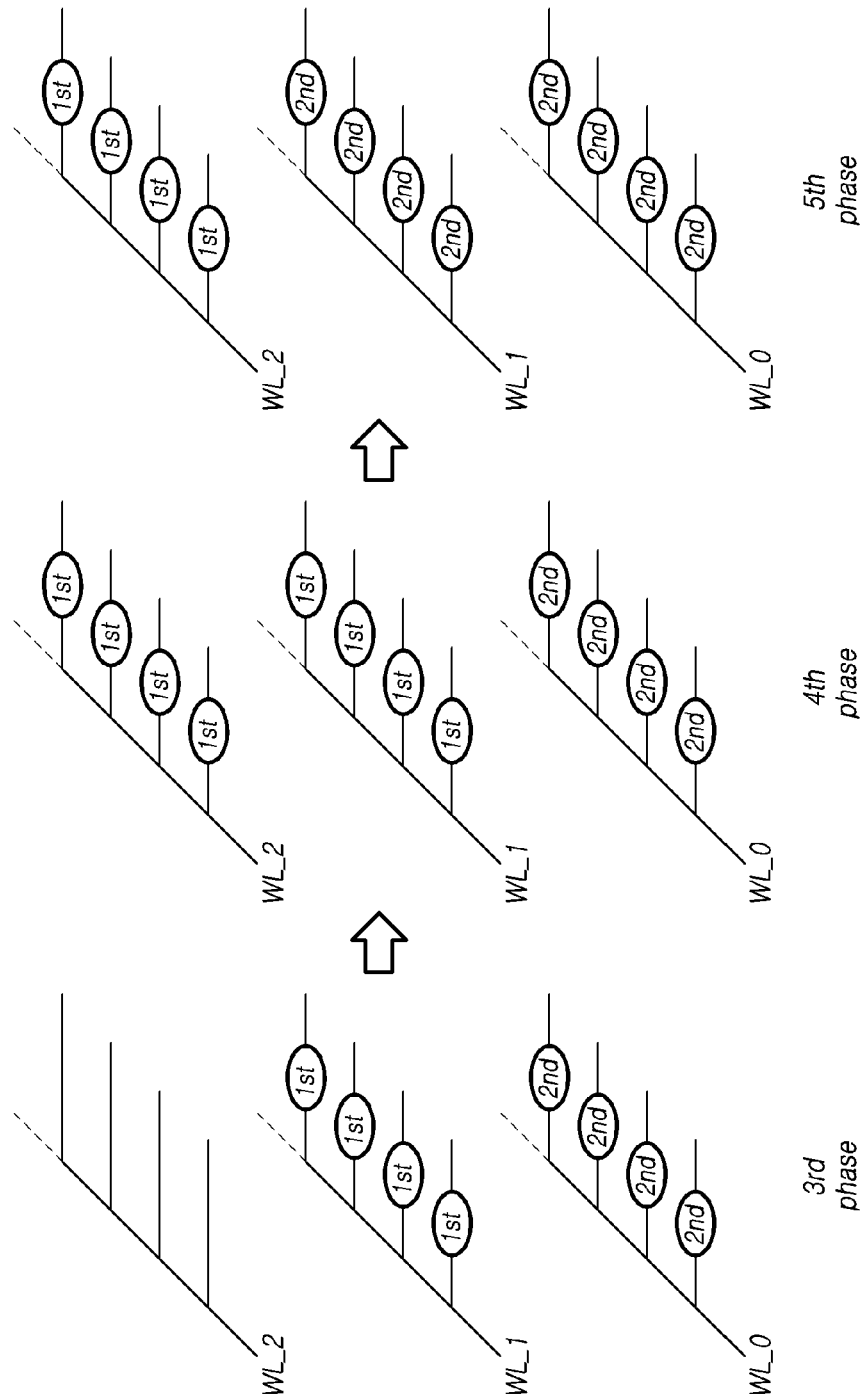

Hereinafter, an embodiment in which there are multiple word lines and data are programmed in memory cells connected to the multiple word lines is described. FIGS. 9 and 10 illustrate an example of programming data in memory cells in the memory system 100 according to an embodiment of the present disclosure.

When there are multiple word lines and data are programmed in memory cells connected to the multiple word lines, a program operation based on a first program scheme 1ST_PGM and a program operation based on a second program scheme 2ND_PGM for memory cells connected to one word line may not be necessarily performed successively. That is because programming the memory cells connected to one word line according to the first program scheme 1ST_PGM may affect threshold voltage distributions of memory cells connected to an adjacent word line.

For example, it is assumed that a program operation based on first and second program schemes have been completed with respect to memory cells connected to a first word line among word lines included in the memory device 110. When the program operation based on the first program scheme is performed for a memory cell connected to another word line adjacent to the first word line, threshold voltage distributions of the memory cells connected to the first word line may be affected by the program operation. Therefore, a read fail is more likely to occur during reading data programmed in the memory cells connected to the first word line.

Therefore, the memory controller 120 may program, according to the first program scheme, different data in memory cells connected to a second word line among the word lines included in the memory device 110 between a first time at which data (e.g., all or some of the user data segments) are programmed in the memory cells connected to the first word line according to the first program scheme and a second time at which the data is programmed in the memory cells connected to the first word line according to the second program scheme.

When the memory controller 120 programs data as described above, even though a threshold voltage distribution of a memory cell connected to the first word line is influenced by a program operation (according to the first program scheme) for a memory cell connected to the second word line, the influence may be eliminated or substantially reduced by subsequently programming the data in the memory cell connected to the first word line according to the second program scheme.

Specifically, in FIG. 9, first, the memory controller 120 programs data in memory cells connected to a word line WL_0 according to a first program scheme ($1^{st}$ phase).

Thereafter, instead of programming the data in the memory cells connected to the word line WL_0 according to a second program scheme, the memory controller 120 programs the data in memory cells connected to a word line WL_1 according to the first program scheme ($2^{nd}$ phase). That is because if there are multiple word lines and the memory controller 120 first programs data in memory cells connected to the multiple word lines, an operation of programming data in memory cells connected to the adjacent word line WL_1 according to the first program scheme by the memory controller 120 thereafter has an influence on the threshold voltage distribution of memory cells connected to the word line WL_0 in which programming has been already finished.

Thereafter, the memory controller 120 programs the data in the memory cells connected to the word line WL_0 according to the second program scheme ($3^{rd}$ phase). In addition, the program operation for the memory cells connected to the word line WL_0 is finished.

In FIG. 10, after $3^{rd}$ phase, instead of programming the data in the memory cells connected to the word line WL_1 according to the second program scheme, the memory controller 120 programs the data in memory cells connected to a word line WL_2 according to the first program scheme ($4^{th}$ phase).

Thereafter, the memory controller 120 programs the data in the memory cells connected to the word line WL_1 according to the second program scheme ($5^{th}$ phase). In addition, the program operation for the memory cells connected to the word line WL_1 is finished.

FIG. 11 is a table illustrating an example of the order in which data is programmed in memory cells on the basis of the operation illustrated in FIGS. 9 and 10.

It is assumed that four memory cells (cell_1, cell_2, cell_3, and cell_4) are connected to each of word lines (WL_0, WL_1, WL_2, WL_3, . . . ), and data are sequentially programmed in the four memory cells connected to one word line in the order of cell_1, cell_2, cell_3 and cell_4.

The order in which data are programmed in the memory cells is determined as follows.

First, the data are programmed in memory cells cell_1, cell_2, cell_3, and cell_4 connected to the word line WL_0 according to the first program scheme 1ST_PGM. (Program Order 1, 2, 3, 4)

Thereafter, the data are programmed in memory cells cell_1, cell_2, cell_3, and cell_4 connected to the word line WL_1 according to the first program scheme 1ST_PGM. (Program Order 5, 6, 7, 8)

Thereafter, the data are programmed in the memory cells cell_1, cell_2, cell_3, and cell_4 connected to the word line WL_0 according to the second program scheme 2ND_PGM. (Program Order 9, 10, 11, 12)

Thereafter, the data are programmed in memory cells cell_1, cell_2, cell_3, and cell_4 connected to the word line WL_2 according to the first program scheme 1ST_PGM. (Program Order 13, 14, 15, 16)

Thereafter, the data are programmed in the memory cells cell_1, cell_2, cell_3, and cell_4 connected to the word line WL_1 according to the second program scheme 2ND_PGM. (Program Order 17, 18, 19, 20)

Thereafter, the data are programmed in memory cells cell_1, cell_2, cell_3, and cell_4 connected to the word line WL_3 according to the first program scheme 1ST_PGM. (Program Order 21, 22, 23, 24)

Thereafter, the data are programmed in the memory cells cell_1, cell_2, cell_3, and cell_4 connected to the word line WL_2 according to the second program scheme 2ND_PGM. (Program Order 25, 26, 27, 28)

Above, description of the program order between memory cells connected to different word lines in the memory device 110 is described.

Below, the program order between a user data segment and a map data segment queued in one virtual die queue is described.

Figure 12:
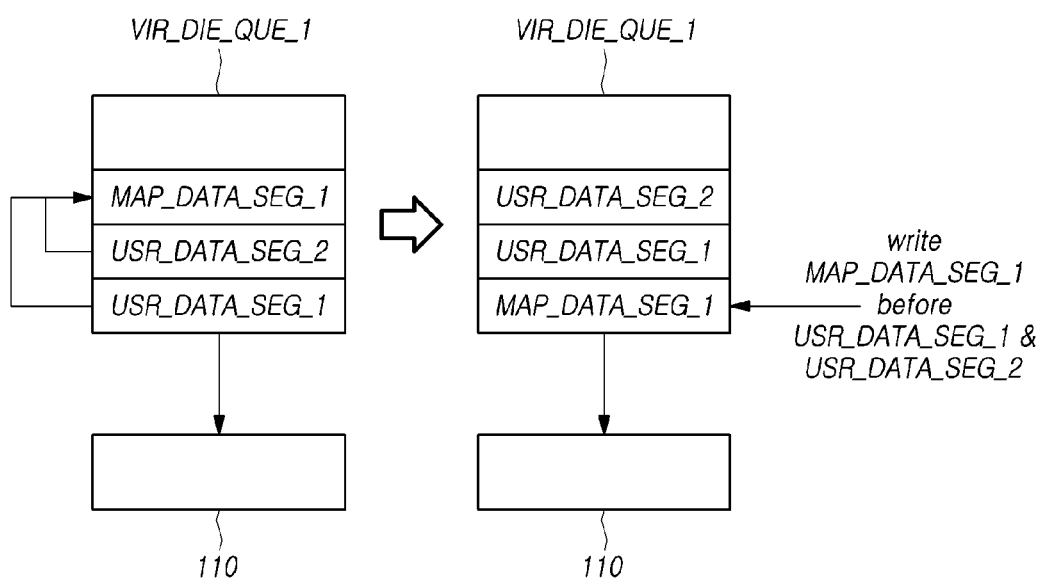
FIG. 12 illustrates an example of program order of a user data segment and a map data segment queued in a first virtual die queue in a memory system according to an embodiment of the present disclosure.

FIG. 12 illustrates an example of the program order of a user data segment and a map data segment queued in a first virtual die queue in the memory system 100 according to an embodiment of the present disclosure.

In FIG. 12, user data segments USER_DATA_SEG_1 and USER_DATA_SEG_2 and a map data segment MAP_DATA_SEG_1 including mapping information regarding the user data segments USER_DATA_SEG_1 and USER_DATA_SEG_2 are queued in the first virtual die queue VIR_DIE_QUE_1.

The memory controller 120 of the memory system 100 programs, in the memory device 110, the user data segments USER_DATA_SEG_1 and USER_DATA_SEG_2 and the map data segment MAP_DATA_SEG_1 queued in the first virtual die queue VIR_DIE_QUE_1.

According to an embodiment of the present disclosure, the memory controller 120 stores the map data segment MAP_DATA_SEG_1 in the memory device 110 before storing the user data segments USER_DATA_SEG_1 and USER_DATA_SEG_2, regardless of the order in which the user data segments USER_DATA_SEG_1 and USER_DATA_SEG_2 and the map data segment MAP_DATA_SEG_1 have been queued in the first virtual die queue VIR_DIE_QUE_1.

In conventional memory systems, in order to provide against the case in which sudden-power-off (SPO) occurs before user data are programmed after map data are programmed, the user date is programmed before the map date is programmed.

However, in embodiments of the present disclosure, as described above, user data is programmed according to the first program scheme and then the second program scheme. Further, as described in FIGS. 9 to 11, another program operation may be performed between the program operations according to the first program scheme and the second program scheme.

Therefore, when the map data is programmed after the user data has been completely programmed, the map data has to wait for completion of both programming schemes. Thus, a map is in a busy state during that wait period.

In this instance, the memory controller 120 cannot update the map data in a map cache, and thus cannot quickly process an operation (e.g. a trim operation) required to update the map data in the map cache.

Therefore, in embodiments of the present disclosure, in order to prevent such issues, the memory controller 120 may program a map data segment in the memory device 110 before programming a user data segment corresponding to the map data segment, regardless of the order of the map data and user data segments queued in a virtual die queue. Thus, the memory controller 120 can quickly update map data in a map cache and can quickly process operations required to update the map data in the map cache.

However, when the map data segment is programmed in the in the memory device 110 before the user data segment is programmed therein, the map data segment should be updated in the map cache after a program operation for a user data segment corresponding thereto is completed. If the map data segment is updated in the map cache before the program operation for the user data segment is completed, a read fail may occur due to the incomplete state of the program operation for the user data segment when the memory controller 120 reads the user data in the memory device 110 on the basis of mapping information included in the map data segment updated in the map cache.

Figure 13:
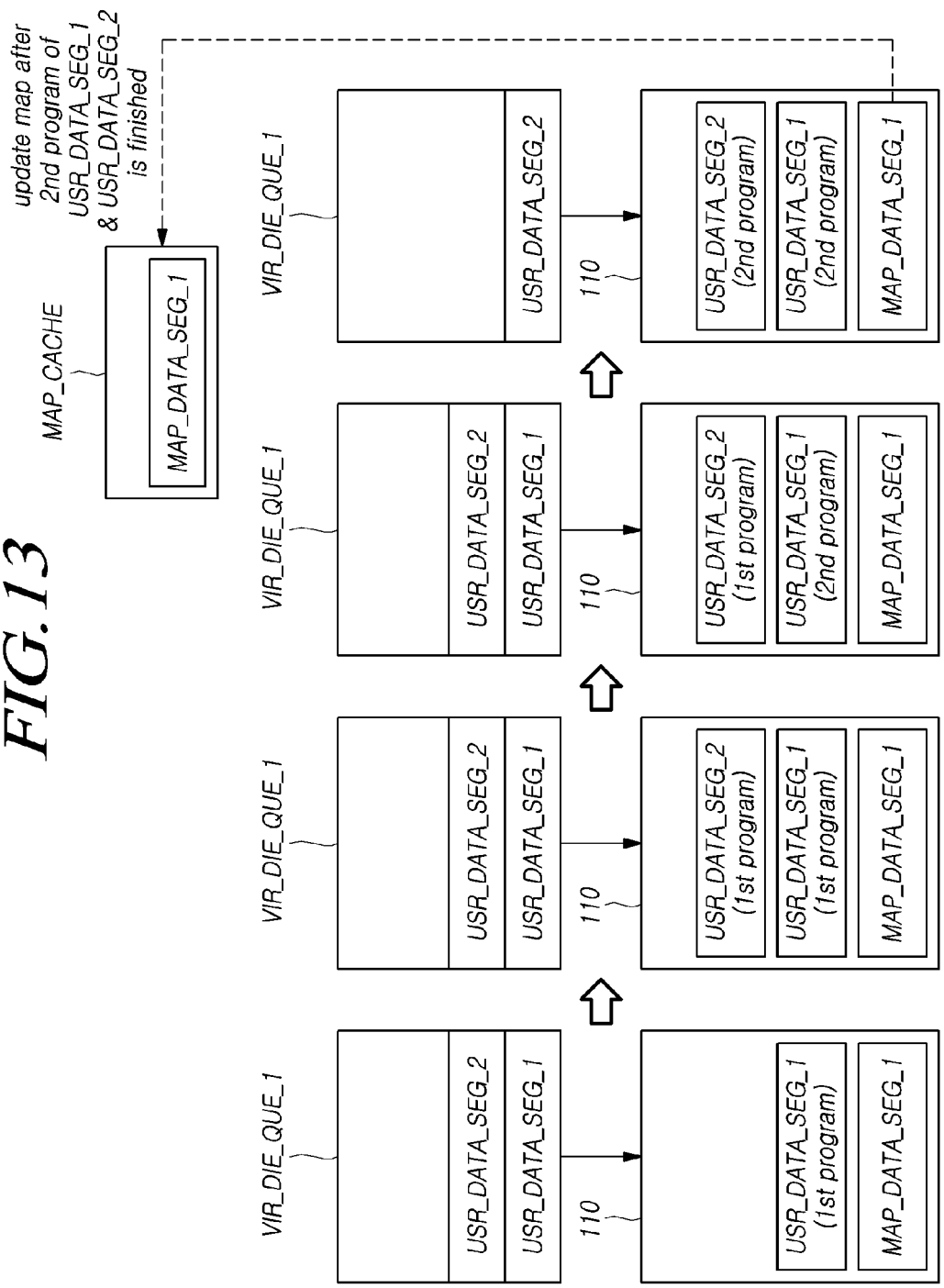
FIG. 13 illustrates a time at which map data programmed in a memory device is updated in a map cache in a memory system according to an embodiment of the present disclosure.

FIG. 13 illustrates a time at which map data programmed in the memory device 110 is updated in a map cache MAP_CACHE in the memory system 100 according to an embodiment of the present disclosure.

Referring to FIG. 13, as described in FIG. 12, it is assumed that a map data segment MAP_DATA_SEG_1 corresponding to user data segments USR_DATA_SEG_1 and USR_DATA_SEG_2 were programmed in the memory device 110 before the user data segments USR_DATA_SEG_1 and USR_DATA_SEG_2 are programmed therein.

The memory controller 120 of the memory system 100 programs the user data segment USER_DATA_SEG_1 in the memory device 110 according to a first program scheme.

Thereafter, the memory controller 120 programs the user data segment USER_DATA_SEG_2 in the memory device 110 according to the first program scheme.

Thereafter, the memory controller 120 programs the user data segment USER_DATA_SEG_1 in the memory device according to a second program scheme thereby completing the program operation for user data segment USER_DATA_SEG_1.

Thereafter, the memory controller 120 programs the user data segment USER_DATA_SEG_2 in the memory device according to the second program scheme thereby completing the program operation for user data segment USER_DATA_SEG_2.

Thereafter, the memory controller 120 updates the map data segment MAP_DATA_SEG_1 programmed in the memory device 110 in the map cache MAP_CACHE. Then, the memory controller 120 can properly read the user data segment USER_DATA_SEG_1 or the fuser data segment USER_DATA_SEG_2 on the basis of mapping information in the map data segment MAP_DATA_SEG_1 updated in the map cache MAP_CACHE. That is because the program operations for the user data segments USR_DATA_SEG_1 and USR_DATA_SEG_2 have been already completed.

Above, a program order when one map data segment and one user data segment are queued in one virtual die queue is described.

Below, a program order when multiple map data segments and multiple user data segments corresponding to the multiple map data segments are queued in one virtual die queue is described.

Figure 14:
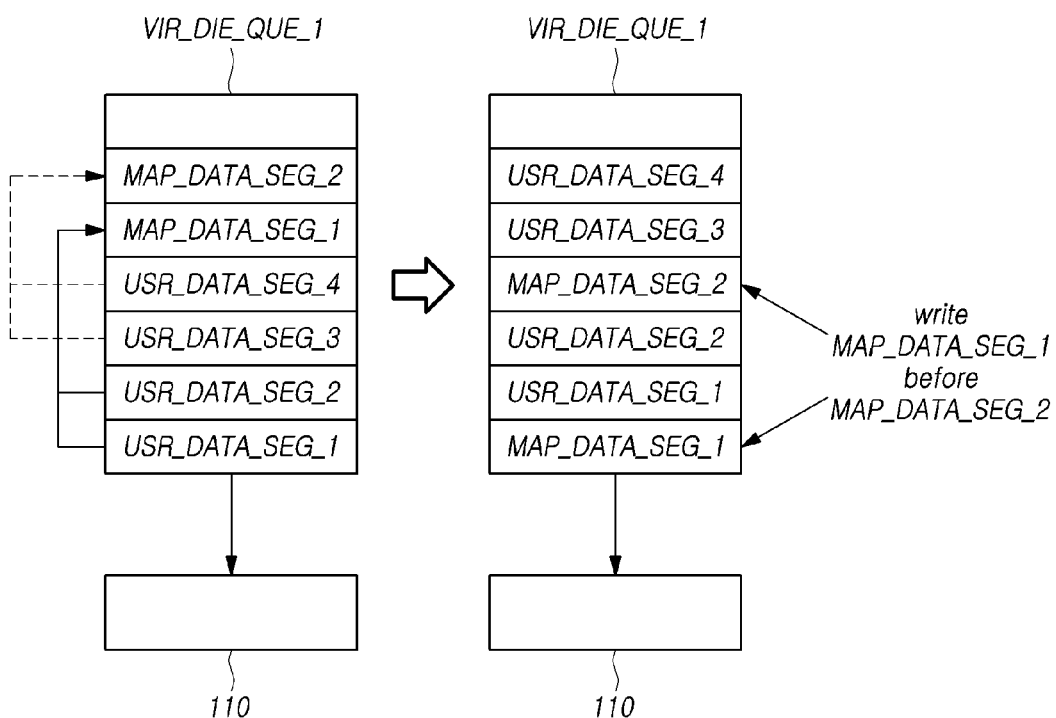
FIG. 14 illustrates another example of program order of user data segments and map data segments queued in a first virtual die queue in a memory system according to an embodiment of the present disclosure.

FIG. 14 illustrates another example of program order of user data segments and map data segments queued in a first virtual die queue in the memory system 100 according to an embodiment of the present disclosure.

Referring to FIG. 14, two map data segments MAP_DATA_SEG_1 and MAP_DATA_SEG_2 are queued in a first virtual die queue VIR_DIE_QUE_1. Further, user data segments USR_DATA_SEG_1 and USR_DATA_SEG_2 corresponding to the map data segment MAP_DATA_SEG_1 are queued, and user data segments USR_DATA_SEG_3 and USR_DATA_SEG_4 corresponding to the map data segment MAP_DATA_SEG_2 are queued.

As described in FIG. 13, the memory controller 120 may change the program order such that the map data segment MAP_DATA_SEG_1 is programmed before the user data segments USR_DATA_SEG_1 and USR_DATA_SEG_2 are programmed. Further, the memory controller 120 may change the program order such that the map data segment MAP_DATA_SEG_2 is programmed before the user data segments USR_DATA_SEG_3 and USR_DATA_SEG_4 are programmed.

However, even though the program order is changed as described above, the memory controller 120 determines the program order of the map data segments such that the map data segments are programmed according to the order in which they were enqueued in the first virtual die queue VIR_DIE_QUE_1. That is, among the map data segments queued in the first virtual die queue VIR_DIE_QUE_1, the memory controller 120 programs the earlier queued map data segment MAP_DATA_SEG_1 in the memory device 110 before programming the map data segment MAP_DATA_SEG_2.

Figure 15:
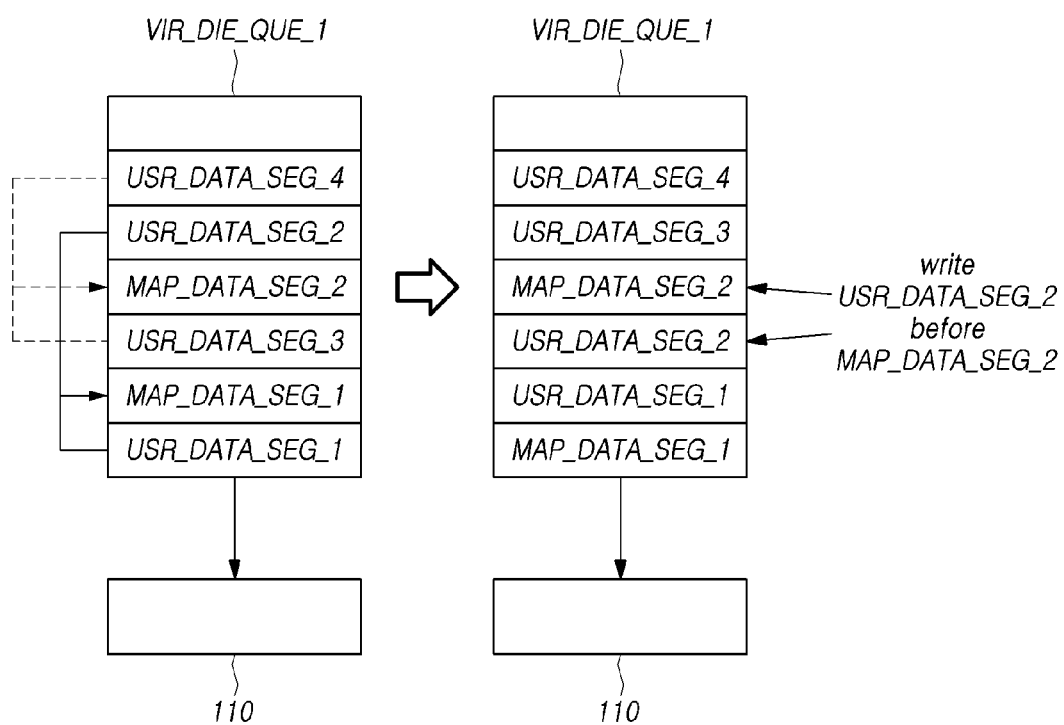
FIG. 15 illustrates another example of program order of user data segments and map data segments queued in a first virtual die queue in a memory system according to an embodiment of the present disclosure.

FIG. 15 illustrates another example of program order of user data segments and map data segments queued in a first virtual die queue in the memory system 100 according to an embodiment of the present disclosure.

Referring to FIG. 15, a map data segment MAP_DATA_SEG_1 has been queued in a first virtual die queue VIR_DIE_QUE_1 before a map data segment MAP_DATA_SEG_2 is enqueued. Among user data segments USR_DATA_SEG_1 and USR_DATA_SEG_2 corresponding to the map data segment MAP_DATA_SEG_1, the user data segment USER_DATA_SEG_2 is enqueued in the first virtual die queue VIR_DIE_QUE_1 after the map data segment MAP_DATA_SEG_2 is queued.

The memory controller 120 programs the map data segment MAP_DATA_SEG_2 in the memory device 110 after programming the map data segment MAP_DATA_SEG_1 as well as the user data segments USR_DATA_SEG_1 and USR_DATA_SEG_2 corresponding to the map data segment MAP_DATA_SEG_1. Therefore, program order between the user data segment USER_DATA_SEG_2 and the map data segment MAP_DATA_SEG_2 is changed.

Figure 16:
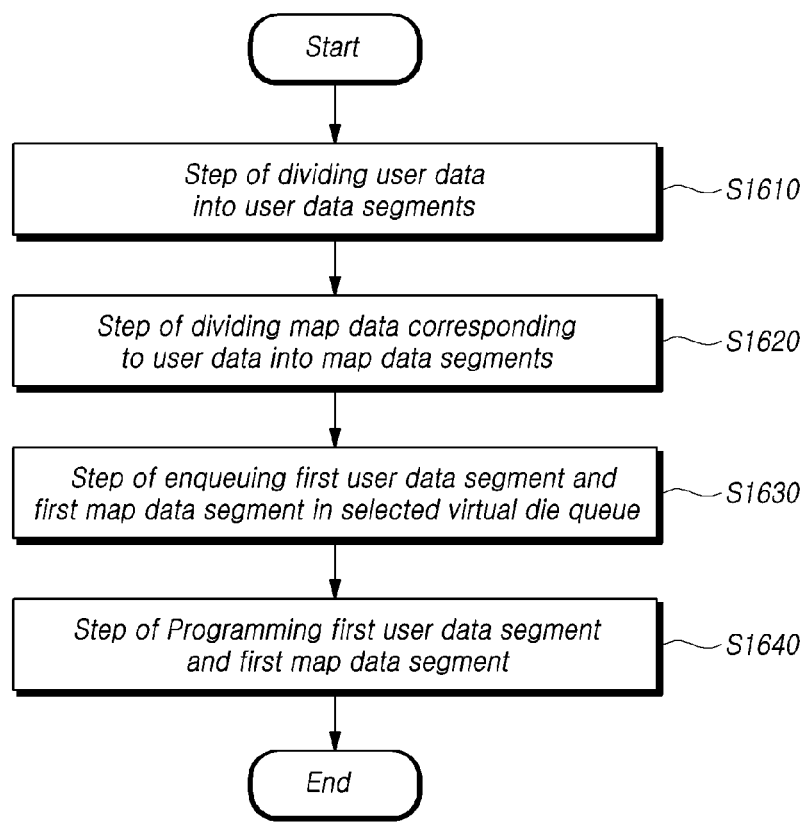
FIG. 16 is a flowchart illustrating an operation method of a memory controller according to an embodiment of the present disclosure.

FIG. 16 is a flowchart illustrating an operation method of the memory controller 120 according to an embodiment of the present disclosure.

The operation method of the memory controller 120 may include dividing user data corresponding to a command received from a host into one or more user data segments (S1610).

The operation method of the memory controller 120 may include dividing map data corresponding to the user data into one or more map data segments (S1620).

The operation method of the memory controller 120 may include enqueueing a first user data segment among the user data segments and a first map data segment corresponding to the first user data segment among the map data segments in a first virtual die queue among N virtual die queues (N is a natural number greater than or equal to 2) (S1630).

The operation method of the memory controller 120 may include programming the first user data segment and the first map data segment in a memory block in one of multiple memory dies in the memory device 110 (S1640).

Here, the entirety, i.e., all, or a part of the first user data segment may be programmed in memory cells connected to a first word line, which is one of multiple word lines in the memory device 110, according to a first program scheme and then programmed according to a second program scheme after the entirety or part of the first user data segment in memory cells connected to the first word line is programmed according to the first program scheme.

The operation of the memory controller 120 as described above may be controlled by the control circuit 123, and may be performed in such a manner that the processor 124 executes (drives) firmware in which all operations of the memory controller 120 are performed.

Figure 17:
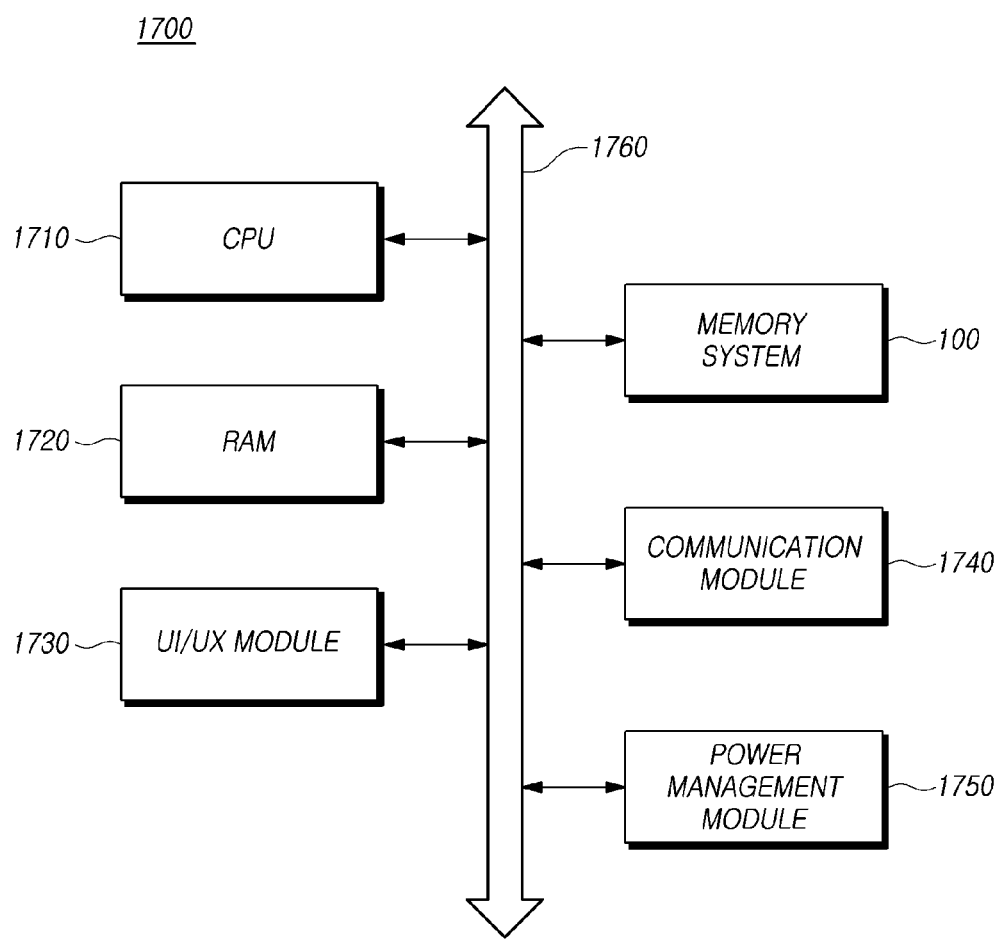
FIG. 17 illustrates a configuration of a computing system according to an embodiment of the present disclosure.

FIG. 17 is a block diagram schematically illustrating a computing system 1700 according to an embodiment of the present disclosure.

Referring to FIG. 17, the computing system 1700 may include a memory system 100 electrically connected to a system bus 1760; a central processing unit (CPU) 1710 configured to control overall operation of the computing system 1700; a random access memory (RAM) 1720 configured to store data and information regarding the operation of the computing system 1700; a user interface/user experience (UI/UX) module 1730 configured to provide a use environment to a user; a communication module 1740 configured to communicate with an external device in a wired and/or wireless manner; and a power management module 1750 configured to manage power used by the computing system 1700.

The computing system 1700 may be a personal computer (PC) or may be embodied in any of various electronic devices or mobile terminals such as a smart phone, a tablet computer, etc.

The computing system 1700 may further include a battery for supplying an operation voltage, an application chipset, a graphic-related module, a camera image processor (CIS), DRAM, and the like. Of course, the computing system 1700 may include other components as those skilled in the art understand.

The memory system 100 may include a device for storing data in a magnetic disk (e.g., hard disk drive (HDD)). Alternatively, the memory system 100 may include a device for storing data in a nonvolatile memory (e.g., solid state drive (SSD), a universal flash storage (UFS) device, and/or an embedded MMC (eMMC) device). The nonvolatile memory may include any of a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various types of storage devices, and may be disposed in any of various types of electric devices.

Although embodiments of the present invention have been illustrated and described, those skilled in the art will appreciate that various modifications, additions and substitutions are possible, without departing from the scope and spirit of the disclosure as disclosed in the accompanying claims. Therefore, the disclosed embodiments are presented merely as examples. The scope of the present invention encompasses all arrangements and configurations that fall within the scope of the claims including their equivalents.

What is claimed is:
1. A memory system comprising:
a memory device comprising multiple memory dies and multiple memory blocks disposed in the multiple memory dies; and
a memory controller configured to:
divide user data corresponding to a command received from a host into user data segments;
divide map data corresponding to the user data into map data segments;
enqueue, in a selected virtual die queue, among N virtual die queues, a first user data segment among the user data segments and a first map data segment corresponding to the first user data segment among the map data segments, where N is a natural number of 2 or more; and
program the first user data segment and the first map data segment in a memory block in one of the multiple memory dies,
wherein all or a part of the first user data segment is programmed according to a first program scheme in memory cells connected to a first word line among multiple word lines in the memory device and then the all or a part of the first user data segment programmed according to the first program scheme is programmed again according to a second program scheme in memory cells connected to the first word line among multiple word lines in the memory device.

2. The memory system of claim 1, wherein the memory controller enqueues the user data segments and the map data segments in the N virtual die queues in a striping scheme.

3. The memory system of claim 1, wherein threshold voltage distribution of memory cells programmed according to the first program scheme is wider than threshold voltage distribution of memory cells programmed according to the second program scheme.

4. The memory system of claim 3, wherein the memory cells are quad-level cells.

5. The memory system of claim 1, wherein the memory controller programs, according to the first program scheme, data different from the first user data segment in memory cells connected to a second word line among the word lines in the memory device between a first time at which all or part of the first user data segment is programmed in the memory cells connected to the first word line according to the first program scheme and a second time at which all or part of the first user data segment is programmed in the memory cells connected to the first word line according to the second program scheme.

6. The memory system of claim 1, wherein the memory controller programs the first map data segment in the memory device before programming the first user data segment, regardless of order in which the first map data segment and first user data segment are enqueued in the selected virtual die queue.

7. The memory system of claim 6, wherein the memory controller updates the first map data segment in a map cache after the first user data segment is programmed in the memory device according to the second program scheme.

8. The memory system of claim 1, wherein, when a second map data segment is queued in the selected virtual die before the first map data segment is enqueued in the selected virtual die queue, the memory controller programs the first map data segment in the memory device after programming the second map data segment.

9. The memory system of claim 8, wherein the memory controller programs the first map data segment in the memory device after programming a second user data segment corresponding to the second map data segment.

10. A memory controller comprising:
a memory interface configured to communicate with a memory device, which comprises multiple memory dies including multiple memory blocks; and
a control circuit configured to:
divide user data corresponding to a command received from a host into user data segments;
divide map data corresponding to the user data into map data segments;
enqueue, in a selected virtual die queue among N virtual die queues, a first user data segment among the user data segments and a first map data segment corresponding to the first user data segment among the map data segments, where N is a natural number of 2 or more; and
program the first user data segment and the first map data segment in a memory block in one of the multiple memory dies,
wherein all or a part of the first user data segment is programmed, according to a first program scheme in memory cells connected to a first word line among multiple word lines in the memory device and then the all or a part of the first user data segment programmed according to the first program scheme is programmed again according to a second program scheme, in memory cells connected to the first word line among multiple word lines included in the memory device.

11. The memory controller of claim 10, wherein the control circuit enqueues the user data segments and the map data segments in the N virtual die queues in a striping scheme.

12. The memory controller of claim 10, wherein threshold voltage distribution of memory cells programmed according to the first program scheme is wider than threshold voltage distribution of memory cells programmed according to the second program scheme.

13. The memory controller of claim 12, wherein the memory cells are quad-level cells.

14. The memory controller of claim 10, wherein the control circuit programs, according to the first program scheme, data different from the first user data segment in memory cells connected to a second word line among the word lines in the memory device between a first time at which all or part of the first user data segment is programmed in the memory cells connected to the first word line according to the first program scheme and a second time at which all or part of the first user data segment is programmed in the memory cells connected to the first word line according to the second program scheme.

15. The memory controller of claim 10, wherein the control circuit programs the first map data segment in the memory device before programming the first user data segment, regardless of order in which the first map data segment and the first user data segment are enqueued in the selected virtual die queue.

16. The memory controller of claim 15, wherein the control circuit updates the first map data segment in a map cache after the first user data segment is programmed in the memory device according to the second program scheme.

17. The memory controller of claim 10, wherein, when a second map data segment is queued in the selected virtual die queue before the first map data segment is enqueued in the selected virtual die queue, the control circuit programs the first map data segment in the memory device after programming the second map data segment.

18. The memory controller of claim 17, wherein the control circuit programs the first map data segment in the memory device after programming a second user data segment corresponding to the second map data segment.

19. An operation method of a memory controller configured to control a memory device which comprises multiple memory dies including multiple memory blocks, the method comprising:
dividing user data corresponding to a command received from a host into user data segments;
dividing map data corresponding to the user data into map data segments;
enqueueing, in a selected virtual die queue among N virtual die queues, a first user data segment among the user data segments and a first map data segment corresponding to the first user data segment among the map data segments, where N is a natural number of 2 or more; and
programming the first user data segment and the first map data segment in a memory block in one of the multiple memory dies,
wherein all or a part of the first user data segment is programmed according to a first program scheme in memory cells connected to a first word line among multiple word lines in the memory device and then the all or a part of the first user data segment programmed according to the first program scheme is programmed again according to a second program scheme, in memory cells connected to the first word line among word lines included in the memory device.

* * * * *